US010322802B1

(12) United States Patent
Krishnaswamy et al.

(10) Patent No.: US 10,322,802 B1
(45) Date of Patent: Jun. 18, 2019

(54) DEPLOYABLE SENSORS

(71) Applicant: Amazon Technologies, Inc., Seattle, WA (US)

(72) Inventors: Sarath Krishnaswamy, Dunstable, MA (US); Jeremiah David Brazeau, Hudson, NH (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/698,154

(22) Filed: Sep. 7, 2017

(51) Int. Cl.
*G05D 1/00* (2006.01)
*B64C 39/02* (2006.01)
*G01C 21/20* (2006.01)
*H04W 88/08* (2009.01)
*G01C 21/34* (2006.01)

(52) U.S. Cl.
CPC .......... *B64C 39/024* (2013.01); *G01C 21/206* (2013.01); *G01C 21/3423* (2013.01); *G05D 1/0027* (2013.01); *H04W 88/08* (2013.01); *G05B 2219/31005* (2013.01); *G05B 2219/31006* (2013.01)

(58) Field of Classification Search
CPC . B64C 39/024; G01C 21/3423; G05D 1/0027
See application file for complete search history.

(56) References Cited

U.S. PATENT DOCUMENTS

| 6,400,996 | B1 | 6/2002 | Hoffberg et al. |
| 8,280,547 | B2 | 10/2012 | D'Andrea et al. |
| 8,825,226 | B1 | 9/2014 | Worley, III et al. |
| 9,087,314 | B2 | 7/2015 | Hoffman et al. |
| 9,477,938 | B1 * | 10/2016 | Russell ................ G06Q 10/087 |
| 10,007,890 | B1 * | 6/2018 | Purwin ................ G06Q 10/087 |
| 2013/0218456 | A1 * | 8/2013 | Zelek ................. G01C 21/3652 701/412 |
| 2016/0107749 | A1 | 4/2016 | Mucci |
| 2016/0188755 | A1 | 6/2016 | Gonzalez-Banos et al. |

OTHER PUBLICATIONS

U.S. Appl. No. 15/698,360, filed Sep. 7, 2017, Titled: Deployable Sensors for Global Workspace Monitoring.

* cited by examiner

*Primary Examiner* — Adam M Alharbi
(74) *Attorney, Agent, or Firm* — Kilpatrick Townsend & Stockton LLP

(57) ABSTRACT

Systems and methods for gathering sensor information using on-demand sensors and fixed sensors are described herein. For example, a system may include an on-demand sensor available for selective deployment within a workspace in which a plurality of mobile drive units transport a plurality of inventory holders. The system may also include a computing device that monitors movement of a mobile drive unit based on first sensor information. The computing device may also detect a triggering condition relating to the movement of the mobile drive unit. The computing device may also cause an on-demand sensor to collect second sensor information within the workspace based at least in part on detecting the triggering condition.

16 Claims, 21 Drawing Sheets

DEPLOYABLE SENSORS

CROSS REFERENCE TO RELATED APPLICATIONS

This is application is related to U.S. application Ser. No. 15/698,360, filed Sep. 7, 2017, the contents of which are herein incorporated in its entirety.

BACKGROUND

Visual monitoring of conditions within an arbitrary area such as an interior of a building can be performed using sensors such as cameras. The cameras may be positioned and oriented in a manner that enables viewing of specific areas within the interior of the building. As the complexity and number of objects (e.g., shelves, walls, doors, machines, furniture, moveable objects, etc.) in the interior of the building increase, the number of cameras required for condition monitoring also increases.

BRIEF DESCRIPTION OF THE DRAWINGS

Various examples in accordance with the present disclosure will be described with reference to the drawings, in which.

DETAILED DESCRIPTION

Figure 1:
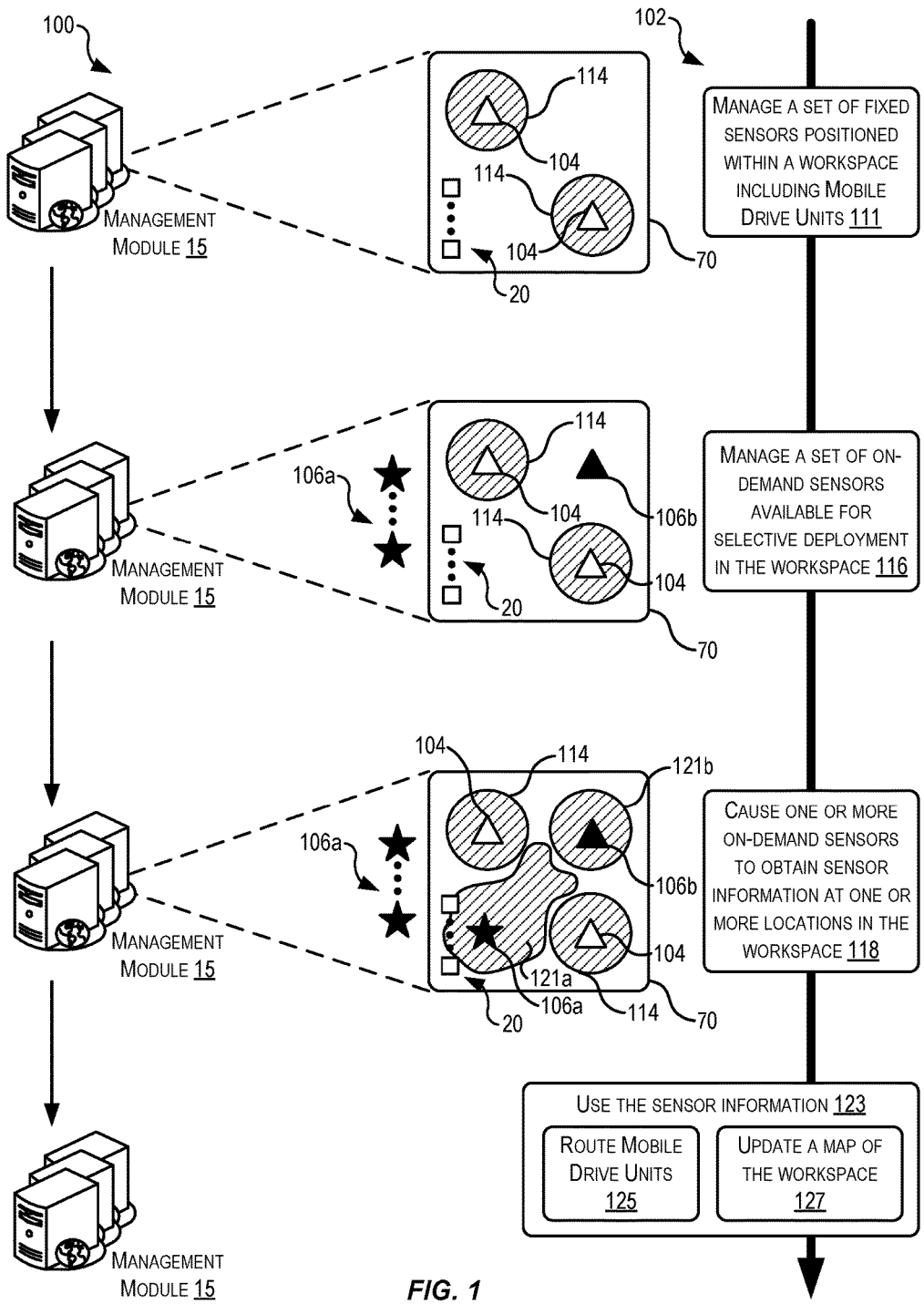
FIG. 1 illustrates an example block diagram and corresponding flow diagram for gathering visual information using combinations of fixed sensors and on-demand sensors, according to at least one example.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Examples herein are directed, among other things, systems and techniques relating to gathering visual information using combinations of fixed sensors and on-demand sensors. The systems and techniques can be implemented in a workspace of a material handling system in order to provide visual information for consumption by automated devices (e.g., mobile drive units that move autonomously throughout the material handling system) that operate in the material handling system. The visual information can also be used to maintain and update a global view map of the workspace. The fixed sensors can be positioned at fixed locations throughout the workspace to monitor certain areas (e.g., high-traffic areas). The on-demand sensors can be selectively deployed throughout the workspace to collect additional visual information on an as-needed basis (e.g., as requested, as inferred, as offered, etc.). For example, a first on-demand sensor connected to an unmanned aerial vehicle can be deployed to a high-traffic area to supplement the monitoring coverage provided by a fixed sensor in the same area. The unmanned aerial vehicle can be given instructions about where supplemental monitoring is requested (e.g., a location in the workspace) and how to orient a view angle of the first on-demand sensor to obtain supplemental visual information. In this manner, a visual representation of the area can be enhanced using the supplemental visual information from the on-demand sensor, which may be of a higher resolution as compared to visual information collected by the fixed sensor. As an additional example, a second on-demand sensor connected to a mobile drive unit or end of a robotic arm can be deployed to an area in the workspace that is outside a coverage range of the fixed sensor. Part of deploying the second on-demand sensor can include providing instructions for orienting the second on-demand sensor and/or contextual information (e.g., defined characteristics of an item). At this area, the second on-demand sensor can gather visual information. This visual information can be used for many different purposes, at least one of which is for a mobile drive unit that will soon be moving through the area. When the time between gathering and movement of the mobile drive unit through the area is small, the mobile drive unit can reliably use this visual information (e.g., to move swiftly through an intersection instead of stopping, to avoid an obstruction on its path, etc.).

Turning now to a particular example, in this example, an interior of a material handling facility is outfitted with fixed optical sensors such as cameras. The cameras are connected to a management system. The cameras can be used to monitor activities within the facility. Because of the size of the facility and the complexity of the fixtures and objects disposed within the facility, providing continuous monitoring of the entire facility using the fixed cameras may be cost prohibitive. Thus, the cameras can be positioned at strategic locations throughout the facility (e.g., areas of concern or high activity) in order to strike a balance between complete coverage and associated costs. In order to fill in the gaps between coverage provided by the fixed cameras and/or to provide supplemental monitoring, on-demand cameras are provided in the facility and managed by the management system. The on-demand cameras, for example, can be connected to unmanned aerial vehicles or other automated devices, which can navigate—autonomously or otherwise—to locations in the facility where additional monitoring is needed. The locations where the additional monitoring is needed can be determined in many different ways and based on many different inputs. For example, a mobile drive unit can request additional monitoring of an area of the facility where the mobile drive unit will soon be traveling (e.g., to make sure the path is clear). When certain actions, events, and/or conditions (e.g., likely obstruction, high traffic intersection, etc.) are detected by the management system, the on-demand cameras can be deployed by sending instructions to the unmanned aerial vehicles or other automated devices to gather additional information at corresponding locations within the facility.

Turning now to another particular example, in this example, an interior of a material handling facility is outfitted with fixed optical sensors such as cameras. The cameras are connected to a management system. The cameras can be used to gather visual information within the material handling facility in order to construct a global view map of the interior of the facility. Because of the size of the facility and the complexity of the fixtures and objects disposed within the facility, providing continuous monitoring of the entire facility using the fixed cameras may be cost prohibitive. Thus, the cameras can be positioned at strategic locations throughout the facility (e.g., areas of concern or high activity) in order to strike a balance between complete coverage and associated costs. To ensure, however, that the global view map stays current, on-demand cameras can be provided in the facility and managed by the management system. The on-demand cameras, for example, can be connected to unmanned aerial vehicles or other automated devices, which can navigate—autonomously or otherwise—to locations in the facility where visual information is needed to keep the map current. For example, the fixed cameras may collect visual information at a low spatial resolution (e.g., pixel density) and the on-demand cameras may be configured to collect visual information at a high spatial resolution. To maintain the current map, the unmanned aerial vehicles may fly predefined paths in the facility to ensure that the map (or certain areas of the map) stays current within one or more time thresholds (e.g., first areas not less than 20 minutes old, second areas not less than 5 minutes old). The unmanned aerial vehicles may also collect low resolution visual information (e.g., at an elevation above the facility floor) and, when appropriate, may move to lower elevations to gather higher resolution visual information. This may improve the likelihood that changes in the workspace will be detected and accounted for. The unmanned aerial vehicles can also be deployed on demand to gather enhanced visual information (e.g., high resolution visual information that is fresh) at certain areas. For example, as changes in the workspace are observed based a low resolution visual information, the on-demand cameras can be sent to corresponding locations to "take a closer look" at the changes (e.g., to gather higher resolution visual information). This may result in the on-demand cameras gathering high resolution visual information at the corresponding locations and from different locations than was previously maintained. This visual information can be used to update the global view of the map and for other suitable purposes.

Turning now the figures, FIG. 1 illustrates a simplified block diagram 100 and an example process flow 102 for gathering visual information using combinations of fixed sensors and on-demand sensors, according to at least one example. The diagram 100 depicts example states that correspond to the blocks in the process flow 102. The diagram 100 includes a management module 15 that is in network communication with fixed sensors 104 and on-demand sensors 106. The fixed sensors 104 are positioned at fixed locations within a workspace 70. The on-demand sensors 106 are deployable to various locations within the workspace 70.

As described in detail herein, the management module 15 may include any suitable combination of server computing devices configured to manage operations of the fixed sensors 104, the on-demand sensors 106, mobile drive units 20, and other automated devices that operate within the workspace 70.

The workspace 70 may include any suitable two-dimensional area and/or three-dimensional volume in which an material handling system is implemented. For example, the workspace 70 may include one or more floors of a warehouse, a material handling facility, an inventory processing facility, or other suitable facility in which the material handling system can be implemented. In some examples, the workspace 70 may be divided using any suitable coordinate system. For example, the workspace 70 may be divided into a grid system. The locations of fixed sensors 104, locations of other objects in the workspace 70, paths for mobile drive units 20, and other information about conditions sensed, determined, or otherwise known may be stored by the management module 15. This information can be used to compute areas where additional visual information is required, compute paths for mobile drive units 20, compute instructions for on-demand sensors 106, and for performing other suitable operations.

The mobile drive units 20, as described in detail herein, may be configured to operate within the workspace 70 to perform various tasks relating to inventory and otherwise. For example, the mobile drive units 20 may be configured to detachably couple with and transport inventory holders (e.g., movable shelving units) that are configured to carry inventory items. The mobile drive units 20 may be configured to transport inventory items in the inventory holders within the workspace. For example, the mobile drive units 20 may transport inventory items from a loading station (e.g., where inbound items are added to the inventory holders) to a storage field (e.g., where the inventory holders are placed for an extended period of time) and to a pick station (e.g., where outbound items are removed from the inventory holders). The mobile drive units 20 may also be configured to transport other objects such as hard drives, magnetic tape backups, robotic manipulators (e.g., a robotic arm), reading equipment (e.g., radio-frequency identification reader and antenna), maintenance equipment (e.g., an automated device including a vacuum to clean areas of the workspace 70), pallets, other drive units 20, other material handling equipment (e.g., cranes, conveyor systems, etc.), and any other suitable object or machine capable of being transported by the mobile drive unit 20.

The process 102 may begin at 111 by managing a set of fixed sensors 104 positioned within the workspace 70 including the mobile drive units 20. This may be performed by the management module 15. The fixed sensors 104 may be any suitable sensor capable of object detection. Such sensors can include optical sensors such as imaging devices, depth sensors, visible light cameras, infrared cameras, RGB cameras, depth aware cameras, infrared laser projectors, ultraviolet sensitive cameras, scanning sensors, light filters, and any combination of the foregoing.

Managing the set of fixed sensors 104 may include storing and/or computing a fixed sensor range for each fixed sensor 104, illustrated as areas where fixed sensor information 114 can be collected. In some examples, the management module 15 may store the fixed sensor ranges associated with the fixed sensors 104 along with the fixed sensor information 114 collected by the fixed sensors 104. While the fixed ranges are illustrated as being circular, it should be understood that the ranges may take any suitable shape covering any suitable volume. In some examples, the fixed sensors 104 are positioned at fixed locations in the workspace 70 where traffic is high and/or where ongoing monitoring would be helpful for managing the material handling system. In some examples, managing the set of fixed sensors 104 can include receiving visual information from the fixed sensors 104, storing the visual information 114, instructing the fixed sensors 104 to gather information based on inputs, and the like.

At 116, the process 102 may include managing a set of on-demand sensors 106 available for selective deployment in the workspace 70. This may be performed by the management module 15. The on-demand sensors 106 can be selected from the same group of sensors discussed with reference to the fixed sensors 104. In some examples, the set of on-demand sensors 106 can include mobile on-demand sensors 106a and fixed on-demand sensors 106b.

An example of a mobile on-demand sensor 106a is an optical sensor that is connected to an unmanned aerial vehicle which can carry the mobile on-demand sensor 106a to different locations within the workspace 70. The mobile on-demand sensors 106a can also be connected to other automated devices such as mobile drive units 20. For example, a mobile drive unit 20 may transport inventory items while also collecting visual information using one of the mobile on-demand sensors 106a connected to the mobile drive unit 20.

An example of a fixed on-demand sensor 106b is an optical sensor that is positioned at a fixed location and is typically used for a particular purpose other than those described herein. For example, the fixed on-demand sensor 106b may be a camera of a robotic manipulator that is typically used to detect objects that the robotic manipulator will pick up, but may be deployed for other purposes when requested. For example, assume that two robotic manipulators are working near each other and a first robotic manipulator detects that it has dropped an item but the item cannot be found in a field of view of a camera of the first robotic manipulator. In this example, in response to a request from the first robotic manipulator, a second robotic manipulator may position its camera toward the first robotic manipulator to search for the dropped item. Once identified, an appropriate action can be performed.

At 118, the process 102 may include causing one or more on-demand sensors 106 to obtain on-demand sensor information 121 at one or more locations in the workspace 70. This may be performed by the management module 15 and may include causing the automated devices to which the on-demand sensors 106 are connected to obtain the on-demand sensor information 121. Thus, instances in this specification where "causing on-demand sensors" to perform operations is described may include causing their host devices to perform the operations, which can include local instructions being executed by the host devices.

Causing the on-demand sensors 106 to obtain the on-demand sensor information 121 may include instructing the on-demand sensors 106, publishing a task describing the on-demand sensor information 121 to a common location and allowing the on-demand sensors 106 to select which one of them will be used to obtain the on-demand sensor information 121, and other related approaches. This process of publishing the task and allowing the on-demand sensors 106 to select may be considered a bidding process. The on-demand sensors 106 may bid on the task and a winner may be selected using any suitable combination of factors. Such factors can include, for example, proximity to the location for on-demand sensor information 121, battery life of the automated device, type and resolution of on-demand sensor 106, range of on-demand sensor 106, and other suitable factors.

Causing the on-demand sensors 106 to obtain the on-demand sensor information 121 may include instructing the fixed on-demand sensor 106b to collect fixed on-demand sensor information 121b. Causing the on-demand sensors 106 to obtain the on-demand sensor information 121 may include instructing the mobile on-demand sensor 106a to collect mobile on-demand sensor information 121a. In some examples, the mobile on-demand sensor 106a may move throughout the workspace 70 without the fixed constraints applicable to the fixed sensors 104. Thus, the mobile on-demand sensor 106a may collect on-demand sensor information 121 more freely than the fixed sensors 104.

At 123, the process 102 may include using the sensor information (e.g., the fixed sensor information 114 and/or the on-demand sensor information 121) to perform certain operations, a few of which are illustrated. This may be performed by the management module 15.

An example operation performed using the sensor information can include, at 125, routing mobile drive units 20. For example, the on-demand sensor information 121 can be used to adjust a planned route of a mobile drive unit 20 based on an obstruction identified using the on-demand sensor information 121.

An example operation performed using the sensor information can include, at 127, updating a map of the workspace 70. For example, the fixed sensor information 114 can be used to form first regions of the map and the on-demand sensor information 121 can be used to form second regions of the map. In some examples, the first regions and the second regions overlap to form regions of enhanced detail. The map may include a graphical representation of the workspace 70 that identifies physical objects present within the workspace 70. As the map is updated using updated sensor information, the states (e.g., positions, orientations, etc.) of the objects can be tracked with respect to time. This may provide an operator of the material handling system with an about live view of conditions within the workspace 70. In some examples, other automated devices such as the mobile drive units 20 may rely on the map to make self-adjustments.

At 123, the process 102 may also include using the sensor information (e.g., the fixed sensor information 114 and/or the on-demand sensor information 121) to perform other operations described herein.

Figure 2:
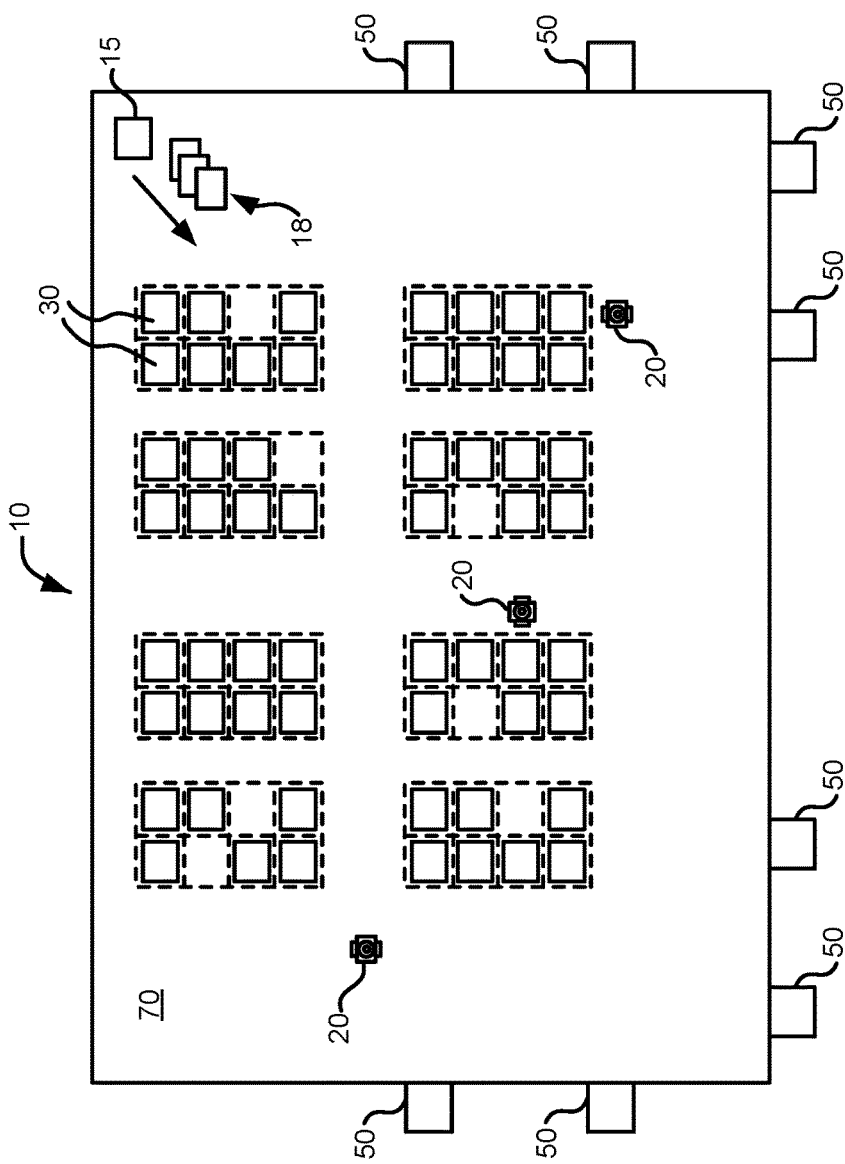
FIG. 2 illustrates components of an material handling system, according to at least one example.

FIG. 2 illustrates the components of an material handling system 10, according to at least one example. The material handling system 10 may include the management module 15, one or more mobile drive units 20, one or more inventory holders 30, and one or more inventory stations 50. The mobile drive units 20 transport the inventory holders 30 between points within the workspace 70 and between other workspaces located above and/or below the workspace 70 in response to commands communicated by the management module 15. Each of the inventory holders 30 may be configured with one or more compartments for containing one or more inventory items. In some examples, the inventory holders 30 may be inventory holders configured to hold one or more containers which may hold inventory items. Thus, the material handling system 10 may be capable of moving inventory items between locations within the workspace 70 to facilitate the entry, processing, and/or removal of inventory items from the material handling system 10 and the completion of other tasks involving inventory items.

The management module 15 may assign tasks to appropriate components of the material handling system 10 and coordinate operation of the various components in completing the tasks. These tasks may relate not only to the movement and processing of inventory items, but also to the management and maintenance of the components of the material handling system 10. For example, the management module 15 may assign portions of the workspace 70 as parking spaces for the mobile drive units 20, the scheduled recharge or replacement of mobile drive unit batteries, the storage of the inventory holders 30, or any other operations associated with the functionality supported by the material handling system 10 and its various components. The management module 15 may select components of the material handling system 10 to perform these tasks and communicate appropriate commands and/or data to the selected components to facilitate completion of these operations. Although shown in FIG. 2 as a single, discrete component, the management module 15 may represent multiple components and may represent or include portions of the mobile drive units 20 or other components of the material handling system 10. As a result, any or all of the interaction between a particular mobile drive unit 20 and the management module 15 that is described below may, in some examples, represent peer-to-peer communication between that mobile drive unit 20 and one or more other mobile drive units 20. The components and operation of an example of the management module 15 are discussed further below with respect to FIG. 3. In some examples, the management module 15 may be distributed between a server and the mobile drive units 20. In this example, the server may provide instructions to the mobile drive units 20 which may process the instructions and generate other instructions to manage components of the mobile drive units 20. In some examples, the management module 15 may include any suitable combination of analog and digital components configured to implement the techniques described herein. For example, the management module 15 may include an analog controller configured to control certain aspects of the operation of the mobile drive unit (e.g., adjusting a mounting angle of the inventory holder 30 relative to the mobile drive unit 20 to account for the distribution of mass of the inventory holder 30, to account for the location of a center of gravity of the inventory holder 30, to account for movement of inventory items in the inventory holder 30, to account for movement of the inventory holder 30 when coupled to the mobile drive unit 20, or to account for any other condition affecting stability of the inventory holder 30).

The mobile drive units 20 may move the inventory holders 30 between locations within the workspace 70. The mobile drive units 20 may represent any devices or components appropriate for use in the material handling system 10 based on the characteristics and configuration of the inventory holders 30 and/or other elements of the material handling system 10. In a particular example of the material handling system 10, the mobile drive units 20 represent independent, self-powered devices configured to freely move about the workspace 70. Examples of such material handling systems are disclosed in U.S. Pat. No. 9,087,314, issued on Jul. 21, 2015, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS", the entire disclosures of which are herein incorporated by reference. In alternative examples, the mobile drive units 20 represent elements of a tracked material handling system configured to move the inventory holders 30 along tracks, rails, cables, crane system, or other guidance or support elements traversing the workspace 70. In such an example, the mobile drive units 20 may receive power and/or support through a connection to the guidance elements, such as a powered rail. Additionally, in some examples of the material handling system 10, the mobile drive units 20 may be configured to utilize alternative conveyance equipment to move within the workspace 70 and/or between separate portions of the workspace 70. The components and operation of an example of a mobile drive unit 20 are discussed further below with respect to FIGS. 4 and 5.

Additionally, the mobile drive units 20 may be capable of communicating with the management module 15 to receive information identifying selected inventory holders 30, transmit the locations of the mobile drive units 20, or exchange any other suitable information to be used by the management module 15 or the mobile drive units 20 during operation. The mobile drive units 20 may communicate with the management module 15 wirelessly, using wired connections between the mobile drive units 20 and the management module 15, and/or in any other appropriate manner. As one example, some examples of the mobile drive unit 20 may communicate with the management module 15 and/or with one another using 802.11, Bluetooth, or Infrared Data Association (IrDA) standards, or any other appropriate wireless communication protocol. As another example, in a tracked material handling system 10, tracks or other guidance elements upon which the mobile drive units 20 move may be wired to facilitate communication between the mobile drive units 20 and other components of the material handling system 10. Furthermore, as noted above, the management module 15 may include components of individual mobile drive units 20. Thus, for the purposes of this description and the claims that follow, communication between the management module 15 and a particular mobile drive unit 20 may represent communication between components of a particular mobile drive unit 20. In general, the mobile drive units 20 may be powered, propelled, and controlled in any manner appropriate based on the configuration and characteristics of the material handling system 10.

In some examples, the inventory holders 30 may store inventory items within containers. In a particular example, the inventory holders 30 may include multiple storage shelves with each storage shelf capable of holding one or more containers. Within each container may be held one or more types of inventory items. The inventory holders 30 are capable of being carried, rolled, and/or otherwise moved by the mobile drive units 20. In some examples, the inventory holder 30 may provide additional propulsion to supplement that provided by the mobile drive unit 20 when moving the inventory holder 30. In some examples, the inventory holders 30 may store inventory items within one or more storage bins.

Additionally, in some examples, inventory items 40 may also hang from hooks or bars (not shown) within or on the inventory holder 30. In general, the inventory holder 30 may store the inventory items 40 in any appropriate manner within the inventory holder 30 and/or on the external surface of the inventory holder 30.

Additionally, each inventory holder 30 may include a plurality of faces. In some examples, each container may be accessible through one or more faces of the inventory holder 30. For example, in a particular example, the inventory holder 30 includes four faces. In such an example, containers located at a corner of two faces may be accessible through either of those two faces, while each of the other containers is accessible through an opening in one of the four faces. The mobile drive unit 20 may be configured to rotate the inventory holder 30 at appropriate times to present a particular face and the containers accessible from that face to an operator or other components of the material handling system 10.

Inventory items represent any objects suitable for storage, retrieval, and/or processing in an automated material handling system 10. For the purposes of this description, "inventory items" may represent any one or more objects of a particular type that are stored in the material handling system 10. Thus, a particular inventory holder 30 is currently "storing" a particular inventory item if the inventory holder 30 currently holds one or more units of that type. As one example, the material handling system 10 may represent a mail order warehouse facility, and inventory items may represent merchandise stored in the warehouse facility. During operation, the mobile drive units 20 may retrieve the inventory holders 30 containing one or more inventory items requested in an order to be packed for delivery to a customer or the inventory holders 30 carrying pallets containing aggregated collections of inventory items for shipment. Moreover, in some examples of the material handling system 10, boxes containing completed orders may themselves represent inventory items.

In some examples, the material handling system 10 may also include one or more inventory stations 50. The inventory stations 50 represent locations designated for the completion of particular tasks involving inventory items. Such tasks may include the removal of inventory items and/or containers from the inventory holders 30, the introduction of inventory items and/or containers into the inventory holders 30, the counting of inventory items and/or containers in the inventory holders 30, the decomposition of inventory items (e.g. from pallet- or case-sized groups to individual inventory items) into containers in the inventory holders 30, the consolidation of inventory items and/or containers between the inventory holders 30, transfer of inventory items and/or containers between the inventory holders 30, and/or the processing or handling of inventory items in any other suitable manner. In some examples, the inventory stations 50 may just represent the physical locations where a particular task involving inventory items can be completed within the workspace 70. In alternative examples, the inventory stations 50 may represent both the physical location and also any appropriate equipment for processing or handling inventory items, such as scanners for monitoring the flow of inventory items in and out of the material handling system 10, communication interfaces for communicating with the management module 15, and/or any other suitable components.

The workspace 70 represents an area associated with the material handling system 10 in which the mobile drive units 20 can move and/or the inventory holders 30 can be stored. For example, the workspace 70 may represent all or part of the floor of a mail-order warehouse in which the material handling system 10 operates. Although FIG. 2 shows, for the purposes of illustration, an example of the material handling system 10 in which the workspace 70 includes a fixed, predetermined, and finite physical space, some examples of the material handling system 10 may include the mobile drive units 20 and the inventory holders 30 that are configured to operate within a workspace 70 that is of variable dimensions and/or an arbitrary geometry. While FIG. 2 illustrates a particular example of the material handling system 10 in which the workspace 70 is entirely enclosed in a building, alternative examples may utilize workspaces 70 in which some or all of the workspace 70 is located outdoors, within a vehicle (such as a cargo ship), located across more than one floor, or otherwise unconstrained by any fixed structure.

In operation, the management module 15 selects appropriate components to complete particular tasks and transmits task assignments 18 to the selected components to trigger completion of the relevant tasks. Each task assignment 18 defines one or more tasks to be completed by a particular component. These tasks may relate to the retrieval, storage, replenishment, and counting of inventory items and/or the management of the mobile drive units 20, the inventory holders 30, the inventory stations 50 and other components of the material handling system 10. Depending on the component and the task to be completed, a particular task assignment 18 may identify locations, components, and/or actions associated with the corresponding task and/or any other appropriate information to be used by the relevant component in completing the assigned task.

In some examples, the management module 15 generates the task assignments 18 based, in part, on inventory requests that the management module 15 receives from other components of the material handling system 10 and/or from external components in communication with the management module 15. These inventory requests identify particular operations to be completed involving inventory items stored or to be stored within the material handling system 10 and may represent communication of any suitable form. For example, in some examples, an inventory request may represent a shipping order specifying particular inventory items that have been purchased by a customer and that are to be retrieved from the material handling system 10 for shipment to the customer. The management module 15 may also generate the task assignments 18 independently of such inventory requests, as part of the overall management and maintenance of the material handling system 10. For example, the management module 15 may generate the task assignments 18 in response to the occurrence of a particular event (e.g., in response to a mobile drive unit 20 requesting a space to park), according to a predetermined schedule (e.g., as part of a daily start-up routine), or at any appropriate time based on the configuration and characteristics of the material handling system 10. After generating one or more task assignments 18, management module 15 transmits the generated task assignments 18 to appropriate components for completion of the corresponding task. The relevant components then execute their assigned tasks.

With respect to the mobile drive units 20 specifically, the management module 15 may, in some examples, communicate the task assignments 18 to selected mobile drive units 20 that identify one or more destinations for the selected mobile drive units 20. The management module 15 may select a mobile drive unit 20 to assign the relevant task based on the location or state of the selected mobile drive unit 20, an indication that the selected mobile drive unit 20 has completed a previously-assigned task, a predetermined schedule, and/or any other suitable consideration. These destinations may be associated with an inventory request the management module 15 is executing or a management objective the management module 15 is attempting to fulfill. For example, the task assignment may define the location of an inventory holder 30 to be retrieved, an inventory station 50 to be visited, a storage location where the mobile drive unit 20 should park until receiving another task, or a location associated with any other task appropriately based on the configuration, characteristics, and/or state of the material handling system 10, as a whole, or individual components of the material handling system 10. For example, in some examples, such decisions may be based on the popularity of particular inventory items, the staffing of a particular inventory station 50, the tasks currently assigned to a particular mobile drive unit 20, and/or any other appropriate considerations.

As part of completing these tasks, the mobile drive units 20 may dock with and transport the inventory holders 30 within the workspace 70. In some examples, docking with an inventory holder 30 may include coupling components of the mobile drive unit 20 to components of the inventory holder 30. The mobile drive units 20 may dock with the inventory holders 30 by connecting to, lifting, and/or otherwise interacting with the inventory holders 30 in any other suitable manner so that, when docked, the mobile drive units 20 are coupled to and/or support the inventory holders 30 and can move the inventory holders 30 within the workspace 70. While the description below focuses on some examples of the mobile drive unit 20 and the inventory holder 30 that are configured to dock in a particular manner, alternative examples of the mobile drive unit 20 and the inventory holder 30 may be configured to dock in any manner suitable to allow the mobile drive unit 20 to move the inventory holder 30 within the workspace 70. Additionally, as noted below, in some examples, the mobile drive units 20 represent all or portions of the inventory holders 30. In such examples, the mobile drive units 20 may not dock with the inventory holders 30 before transporting the inventory holders 30 and/or the mobile drive units 20 may each remain continually docked with a particular inventory holder 30.

While the appropriate components of the material handling system 10 complete assigned tasks, the management module 15 may interact with the relevant components to ensure the efficient use of space, equipment, manpower, and other resources available to the material handling system 10. As one specific example of such interaction, the management module 15 is responsible, in some examples, for planning the paths the mobile drive units 20 take when moving within the workspace 70 and for allocating use of a particular portion of the workspace 70 to a particular mobile drive unit 20 for purposes of completing an assigned task. In such examples, the mobile drive units 20 may, in response to being assigned a task, request a path to a particular destination associated with the task. Moreover, while the description below focuses on one or more examples in which the mobile drive unit 20 requests paths from the management module 15, the mobile drive unit 20 may, in alternative examples, generate its own paths.

Components of the material handling system 10 may provide information to the management module 15 regarding their current state, other components of the material handling system 10 with which they are interacting, and/or other conditions relevant to the operation of the material handling system 10. This may allow the management module 15 to utilize feedback from the relevant components to update algorithm parameters, adjust policies, or otherwise modify its decision-making to respond to changes in operating conditions or the occurrence of particular events.

In addition, while the management module 15 may be configured to manage various aspects of the operation of the components of the material handling system 10, in some examples, the components themselves may also be responsible for decision-making relating to certain aspects of their operation, thereby reducing the processing load on the management module 15.

Thus, based on its knowledge of the location, current state, and/or other characteristics of the various components of the material handling system 10 and an awareness of all the tasks currently being completed, the management module 15 can generate tasks, allot usage of system resources, and otherwise direct the completion of tasks by the individual components in a manner that optimizes operation from a system-wide perspective. Moreover, by relying on a combination of both centralized, system-wide management and localized, component-specific decision-making, some examples of the material handling system 10 may be able to support a number of techniques for efficiently executing various aspects of the operation of the material handling system 10. As a result, some examples of the management module 15 may, by implementing one or more management techniques described below, enhance the efficiency of the material handling system 10 and/or provide other operational benefits.

Figure 3:
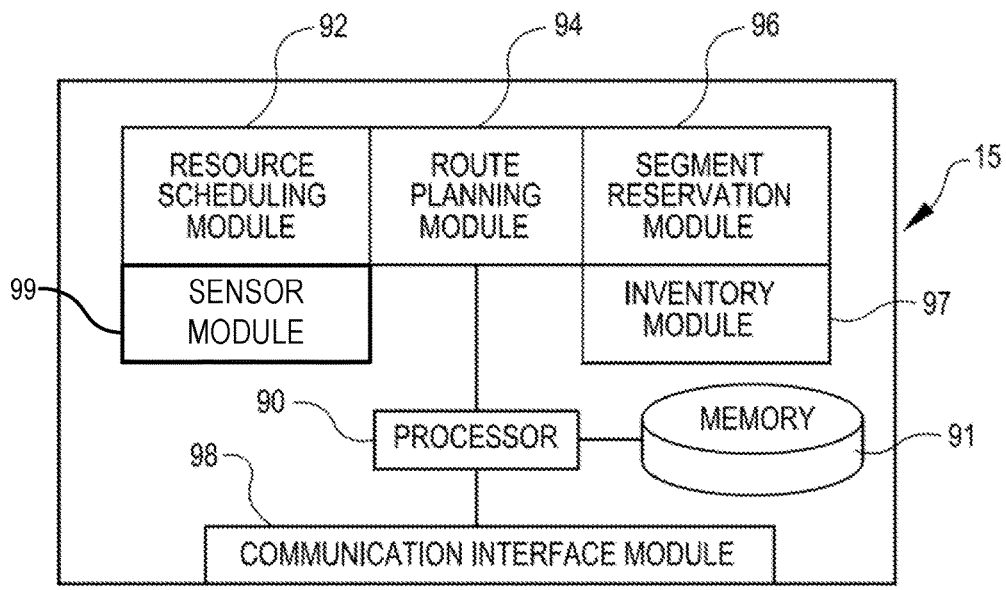
FIG. 3 illustrates in greater detail the components of an example management module that may be utilized in some examples of the material handling system shown in FIG. 2.

FIG. 3 illustrates in greater detail the components of a particular example of the management module 15. As shown, the example includes a resource scheduling module 92, a route planning module 94, a segment reservation module 96, an inventory module 97, a communication interface module 98, a sensor module 99, a processor 90, and a memory 91. The management module 15 may represent a single component, multiple components located at a central location within the material handling system 10, or multiple components distributed throughout material handling system 10. For example, the management module 15 may represent components of one or more mobile drive units 20 that are capable of communicating information between the mobile drive units 20 and coordinating the movement of the mobile drive units 20 within the workspace 70. In general, the management module 15 may include any appropriate combination of hardware and/or software suitable to provide the described functionality.

The processor 90 is operable to execute instructions associated with the functionality provided by the management module 15. The processor 90 may comprise one or more general purpose computers, dedicated microprocessors, or other processing devices capable of communicating electronic information. Examples of the processor 90 include one or more application-specific integrated circuits ("ASICs"), field programmable gate arrays ("FPGAs"), digital signal processors ("DSPs") and any other suitable specific or general purpose processors.

The memory 91 stores processor instructions, inventory requests, reservation information, state information for the various components of the material handling system 10 and/or any other appropriate values, parameters, or information utilized by the management module 15 during operation. For example, the memory 91 may store an overall warehouse map that includes a representation of the material handling system in which the management module 15 operates. The memory 91 may represent any collection and arrangement of volatile or nonvolatile, local or remote devices suitable for storing data. Examples of the memory 91 include, but are not limited to, random access memory ("RAM") devices, read only memory ("ROM") devices, magnetic storage devices, optical storage devices or any other suitable data storage devices.

The resource scheduling module 92 processes received inventory requests and generates one or more assigned tasks to be completed by the components of the material handling system 10. The resource scheduling module 92 may also select one or more appropriate components for completing the assigned tasks and, using the communication interface module 98, communicate the assigned tasks to the relevant components. Additionally, the resource scheduling module 92 may also be responsible for generating assigned tasks associated with various management operations, such as prompting the mobile drive units 20 to recharge batteries or have batteries replaced, instructing the inactive mobile drive units 20 to park in a location outside the anticipated traffic flow or a location near the anticipated site of future tasks, and/or directing the mobile drive units 20 selected for repair or maintenance to move towards a designated maintenance station.

The route planning module 94 receives route requests from the mobile drive units 20. These route requests identify one or more destinations associated with a task the requesting mobile drive unit 20 is executing. In response to receiving a route request, the route planning module 94 generates a path to one or more destinations identified in the route request. The route planning module 94 may implement any appropriate algorithms utilizing any appropriate parameters, factors, and/or considerations to determine the appropriate path. After generating an appropriate path, the route planning module 94 transmits a route response identifying the generated path to the requesting mobile drive unit 20 using the communication interface module 98.

The segment reservation module 96 receives reservation requests from the mobile drive units 20 attempting to move along paths generated by the route planning module 94. These reservation requests request the use of a particular portion of the workspace 70 (referred to herein as a "segment") to allow the requesting mobile drive unit 20 to avoid collisions with other mobile drive units 20 while moving across the reserved segment. In response to received reservation requests, the segment reservation module 96 transmits a reservation response granting or denying the reservation request to the requesting mobile drive unit 20 using the communication interface module 98.

The inventory module 97 maintains information about the location and number of the inventory items 40 in the material handling system 10. Information can be maintained about the number of the inventory items 40 in a particular inventory holder 30, and the maintained information can include the location of those inventory items 40 in the inventory holder 30. The inventory module 97 can also communicate with the mobile drive units 20, utilizing the task assignments 18 to maintain, replenish or move the inventory items 40 within the material handling system 10.

The communication interface module 98 facilitates communication between the management module 15 and other components of the material handling system 10, including reservation responses, reservation requests, route requests, route responses, and task assignments. These reservation responses, reservation requests, route requests, route responses, and task assignments may represent communication of any form appropriate based on the capabilities of the management module 15 and may include any suitable information. Depending on the configuration of the management module 15, the communication interface module 98 may be responsible for facilitating either or both of wired and wireless communication between the management module 15 and the various components of the material handling system 10. In some examples, the management module 15 may communicate using communication protocols such as 802.11, Bluetooth, or Infrared Data Association (IrDA) standards. Furthermore, the management module 15 may, in some examples, represent a portion of the mobile drive unit 20 or other components of the material handling system 10. In such examples, the communication interface module 98 may facilitate communication between the management module 15 and other parts of the same system component.

The sensor module 99 is configured to manage the operation described herein relating to gathering, processing, and otherwise utilizing sensor information from the fixed sensors 104 and/or the on-demand sensors 106.

In general, the resource scheduling module 92, the route planning module 94, the segment reservation module 96, the inventory module 97, the communication interface module 98, and the sensor module 99, may each represent any appropriate hardware and/or software suitable to provide the described functionality. In addition, as noted above, the management module 15 may, in some examples, represent multiple different discrete components and any or all of the resource scheduling module 92, the route planning module 94, the segment reservation module 96, the inventory module 97, the communication interface module 98, and the sensor module 99, may represent components physically separate from the remaining elements of the management module 15. Moreover, any two or more of the resource scheduling module 92, the route planning module 94, the segment reservation module 96, the inventory module 97, the communication interface module 98, and the sensor module 99, may share common components. For example, in some examples, the resource scheduling module 92, the route planning module 94, the segment reservation module 96, the inventory module 97, and the sensor module 99 represent computer processes executing on the processor 90 and the communication interface module 98 comprises a wireless transmitter, a wireless receiver, and a related computer process executing on the processor 90.

Figure 4:
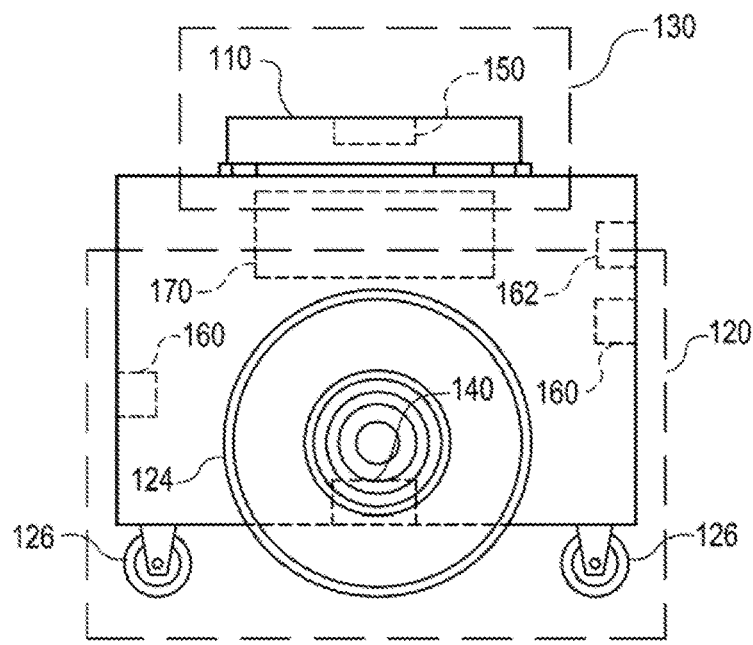
FIGS. 4 and 5 illustrate in greater detail an example mobile drive unit that may be utilized in some examples of the material handling system shown in FIG. 2.
Figure 5:
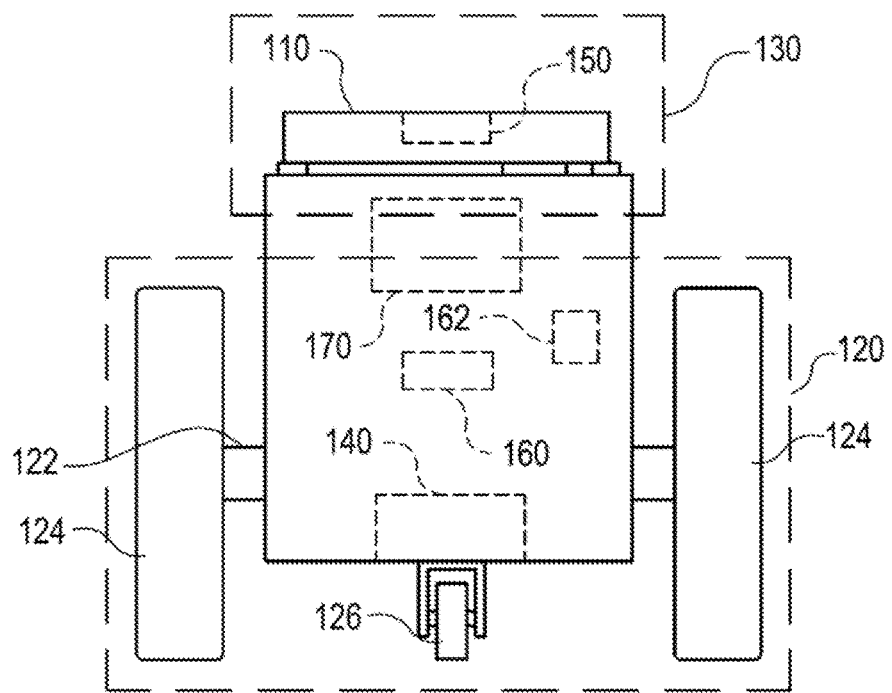

FIGS. 4 and 5 illustrate in greater detail the components of a particular example of the mobile drive unit 20. In particular, FIGS. 4 and 5 include a side and front view of an example mobile drive unit 20. The mobile drive unit 20 includes a platform 110, a drive module 120, a docking head assembly 130, and a control module 170. The platform 110 may be considered a docking head or docking platform. The docking head assembly 130 may be an actuator configured to move the platform 110 to engage with the inventory holder 30. Additionally, the mobile drive unit 20 may include one or more sensors configured to detect or determine the location of the mobile drive unit 20, the inventory holder 30, and/or other appropriate elements of the material handling system 10. In the illustrated example, the mobile drive unit 20 includes a position sensor 140, a holder sensor 150, an obstacle sensor 160, and an identification signal transmitter 162.

The platform 110, in some examples of the mobile drive unit 20, couples the mobile drive unit 20 to the inventory holder 30 and/or supports the inventory holder 30 when the mobile drive unit 20 is docked to the inventory holder 30. The platform 110 may additionally allow the mobile drive unit 20 to maneuver the inventory holder 30, such as by lifting the inventory holder 30, propelling the inventory holder 30, rotating the inventory holder 30, tilting the inventory holder 30, and/or moving the inventory holder 30 in any other appropriate manner. The platform 110 may also include any appropriate combination of components, such as ribs, spikes, and/or corrugations, to facilitate such manipulation of the inventory holder 30. For example, in some examples, the platform 110 may include a high-friction portion that abuts a portion of the inventory holder 30 while the mobile drive unit 20 is docked to the inventory holder 30. In such examples, frictional forces created between the high-friction portion of the platform 110 and a surface of the inventory holder 30 may induce translational and rotational movement in the inventory holder 30 when the platform 110 moves and rotates, respectively. As a result, the mobile drive unit 20 may be able to manipulate the inventory holder 30 by moving or rotating the platform 110, either independently or as a part of the movement of the mobile drive unit 20 as a whole.

The drive module 120 propels the mobile drive unit 20 and, when the mobile drive unit 20 and the inventory holder 30 are docked, the inventory holder 30. The drive module 120 may represent any appropriate collection of components operable to propel the mobile drive unit 20. For example, in the illustrated example, the drive module 120 includes a motorized axle 122, a pair of motorized wheels 124, and a pair of stabilizing wheels 126. One motorized wheel 124 is located at each end of the motorized axle 122, and one stabilizing wheel 126 is positioned at each end of the mobile drive unit 20.

The docking head assembly 130 moves the platform 110 towards the inventory holder 30 to facilitate docking of the mobile drive unit 20 and the inventory holder 30. The docking head assembly 130 may also be capable of adjusting the position or orientation of the platform 110 in other suitable manners to facilitate docking. The docking head assembly 130 may include any appropriate components, based on the configuration of the mobile drive unit 20 and the inventory holder 30, for moving the platform 110 or otherwise adjusting the position or orientation of the platform 110. For example, in the illustrated example, the docking head assembly 130 includes a motorized shaft (not shown) attached to the center of the platform 110. The motorized shaft is operable to lift the platform 110 as appropriate for docking with the inventory holder 30.

The drive module 120 may be configured to propel the mobile drive unit 20 in any appropriate manner. For example, in the illustrated example, the motorized wheels 124 are operable to rotate in a first direction to propel the mobile drive unit 20 in a forward direction. The motorized wheels 124 are also operable to rotate in a second direction to propel the mobile drive unit 20 in a backward direction. In the illustrated example, the drive module 120 is also configured to rotate the mobile drive unit 20 by rotating the motorized wheels 124 in different directions from one another or by rotating the motorized wheels 124 at different speeds from one another.

The position sensor 140 represents one or more sensors, detectors, or other components suitable for determining the location of the mobile drive unit 20 in any appropriate manner. For example, in some examples, the workspace 70 associated with the material handling system 10 includes a number of fiducial marks that mark points on a two-dimensional grid that covers all or a portion of the workspace 70. In such examples, the position sensor 140 may include a camera and suitable image- and/or video-processing components, such as an appropriately-programmed digital signal processor, to allow the position sensor 140 to detect fiducial marks within the camera's field of view. The control module 170 may store location information that the position sensor 140 updates as the position sensor 140 detects fiducial marks. As a result, the position sensor 140 may utilize fiducial marks to maintain an accurate indication of the location of the mobile drive unit 20 and to aid in navigation when moving within the workspace 70.

The holder sensor 150 represents one or more sensors, detectors, or other components suitable for detecting the inventory holder 30 and/or determining, in any appropriate manner, the location of the inventory holder 30, as an absolute location or as a position relative to the mobile drive unit 20. The holder sensor 150 may be capable of detecting the location of a particular portion of the inventory holder 30 or the inventory holder 30 as a whole. The mobile drive unit 20 may then use the detected information for docking with or otherwise interacting with the inventory holder 30.

The obstacle sensor 160 represents one or more sensors capable of detecting objects located in one or more different directions in which the mobile drive unit 20 is capable of moving. The obstacle sensor 160 may utilize any appropriate components and techniques, including optical, radar, sonar, pressure-sensing and/or other types of detection devices appropriate to detect objects located in the direction of travel of the mobile drive unit 20. In some examples, the obstacle sensor 160 may transmit information describing objects it detects to the control module 170 to be used by the control module 170 to identify obstacles and to take appropriate remedial actions to prevent the mobile drive unit 20 from colliding with obstacles and/or other objects.

The obstacle sensor 160 may also detect signals transmitted by other mobile drive units 20 operating in the vicinity of the illustrated mobile drive unit 20. For example, in some examples of the material handling system 10, one or more mobile drive units 20 may include an identification signal transmitter 162 that transmits a drive identification signal. The drive identification signal indicates to the other mobile drive units 20 that the object transmitting the drive identification signal is in fact a mobile drive unit. The identification signal transmitter 162 may be capable of transmitting infrared, ultraviolet, audio, visible light, radio, and/or other suitable signals that indicate to recipients that the transmitting device is a mobile drive unit 20.

Additionally, in some examples, the obstacle sensor 160 may also be capable of detecting state information transmitted by the other mobile drive units 20. For example, in some examples, the identification signal transmitter 162 may be capable of including state information relating to the mobile drive unit 20 in the transmitted identification signal. This state information may include, but is not limited to, the position, velocity, direction, and the braking capabilities of the transmitting mobile drive unit 20. In some examples, the mobile drive unit 20 may use the state information transmitted by other mobile drive units to avoid collisions when operating in close proximity with those other mobile drive units.

The control module 170 monitors and/or controls operation of the drive module 120 and the docking head assembly 130. The control module 170 may also receive information from sensors such as the position sensor 140 and the holder sensor 150 and adjust the operation of the drive module 120, the docking head assembly 130, and/or other components of the mobile drive unit 20 based on this information. Additionally, in some examples, the mobile drive unit 20 may be configured to communicate with a management device of the material handling system 10 and the control module 170 may receive commands transmitted to the mobile drive unit 20 and communicate information back to the management device utilizing appropriate communication components of the mobile drive unit 20. The control module 170 may include any appropriate hardware and/or software suitable to provide the described functionality. In some examples, the control module 170 includes a general-purpose microprocessor programmed to provide the described functionality. Additionally, the control module 170 may include all or portions of the docking head assembly 130, the drive module 120, the position sensor 140, and/or the holder sensor 150, and/or share components with any of these elements of the mobile drive unit 20.

Moreover, in some examples, the control module 170 may include hardware and software located in components that are physically distinct from the device that houses the drive module 120, the docking head assembly 130, and/or the other components of the mobile drive unit 20 described above. For example, in some examples, each mobile drive unit 20 operating in the material handling system 10 may be associated with a software process (referred to here as a "drive agent") operating on a server that is in communication with the device that houses the drive module 120, the docking head assembly 130, and other appropriate components of the mobile drive unit 20. This drive agent may be responsible for requesting and receiving tasks, requesting and receiving routes, transmitting state information associated with the mobile drive unit 20, and/or otherwise interacting with the management module 15 and other components of the material handling system 10 on behalf of the device that physically houses the drive module 120, the docking head assembly 130, and the other appropriate components of the mobile drive unit 20. As a result, for the purposes of this description and the claims that follow, the term "mobile drive unit" includes software and/or hardware, such as agent processors, that provides the described functionality on behalf of the mobile drive unit 20 but that may be located in physically distinct devices from the drive module 120, the docking head assembly 130, and/or the other components of the mobile drive unit 20 described above.

While FIGS. 4 and 5 illustrate a particular example of the mobile drive unit 20 containing certain components and configured to operate in a particular manner, the mobile drive unit 20 may represent any appropriate component and/or collection of components configured to transport and/or facilitate the transport of the inventory holders 30. As another example, the mobile drive unit 20 may represent part of an overhead crane system in which one or more crane assemblies are capable of moving within a network of wires or rails to a position suitable to dock with a particular inventory holder 30. After docking with the inventory holder 30, the crane assembly may then lift the inventory holder 30 and move inventory to another location for purposes of completing an assigned task.

Furthermore, in some examples, the mobile drive unit 20 may represent all or a portion of the inventory holder 30. The inventory holder 30 may include motorized wheels or any other components suitable to allow the inventory holder 30 to propel itself. As one specific example, a portion of the inventory holder 30 may be responsive to magnetic fields. The material handling system 10 may be able to generate one or more controlled magnetic fields capable of propelling, maneuvering and/or otherwise controlling the position of the inventory holder 30 as a result of the responsive portion of the inventory holder 30. In such examples, the mobile drive unit 20 may represent the responsive portion of the inventory holder 30 and/or the components of the material handling system 10 responsible for generating and controlling these magnetic fields. While this description provides several specific examples, the mobile drive unit 20 may, in general, represent any appropriate component and/or collection of components configured to transport and/or facilitate the transport of the inventory holders 30.

Figure 6:
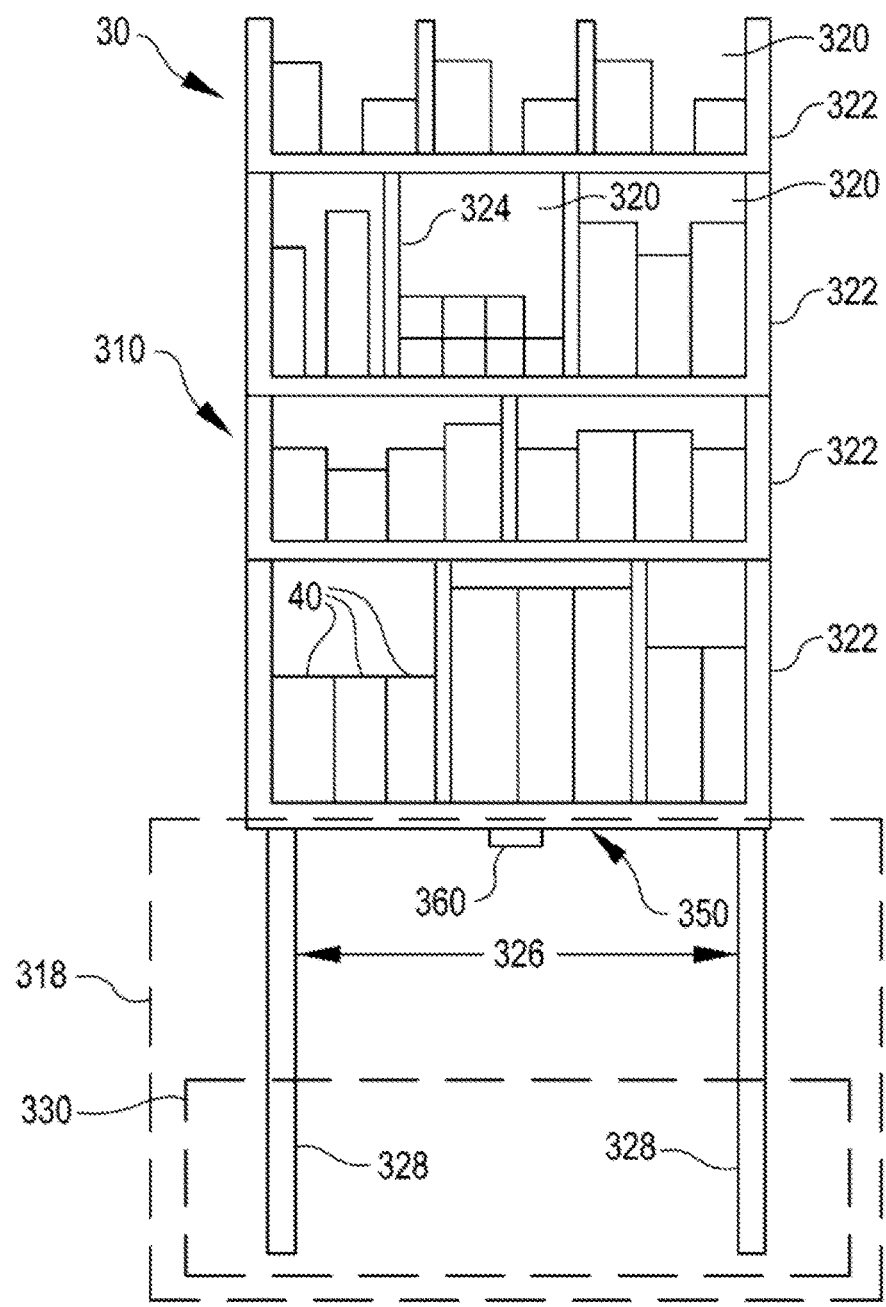
FIG. 6 illustrates in greater detail an example inventory holder that may be utilized in some examples of the material handling system shown in FIG. 3.

FIG. 6 illustrates in greater detail the components of a particular example of the inventory holder 30. In particular, FIG. 6 illustrates the structure and contents of one side of an example inventory holder 30. In a particular example, the inventory holder 30 may comprise any number of faces with similar or different structure. As illustrated, the inventory holder 30 includes a frame 310, a plurality of legs 328, and a docking surface 350.

The frame 310 holds the inventory items 40. The frame 310 provides storage space for storing the inventory items 40 external or internal to the frame 310. The storage space provided by the frame 310 may be divided into a plurality of inventory bins 320, each capable of holding the inventory items 40. The inventory bins 320 may include any appropriate storage elements, such as bins, compartments, or hooks.

In a particular example, the frame 310 is composed of a plurality of trays 322 stacked upon one another and attached to or stacked on a base 318. In such an example, the inventory bins 320 may be formed by a plurality of adjustable dividers 324 that may be moved to resize one or more inventory bins 320. In alternative examples, the frame 310 may represent a single inventory bin 320 that includes a single tray 322 and no adjustable dividers 324. Additionally, in some examples, the frame 310 may represent a load-bearing surface mounted on mobility element 330. The inventory items 40 may be stored on such an inventory holder 30 by being placed on the frame 310. In general, the frame 310 may include internal and/or external storage space divided into any appropriate number of the inventory bins 320 in any appropriate manner.

Additionally, in a particular example, the frame 310 may include a plurality of device openings 326 that allow the mobile drive unit 20 to position the platform 110 adjacent the docking surface 350. The size, shape, and placement of the device openings 326 may be determined based on the size, the shape, and other characteristics of the particular example of the mobile drive unit 20 and/or the inventory holder 30 utilized by the material handling system 10. For example, in the illustrated example, the frame 310 includes four legs 328 (e.g., 328a, 328b, 328c, and 328d) that form the device openings 326 and allow the mobile drive unit 20 to position the mobile drive unit 20 under the frame 310 and adjacent to the docking surface 350. The length of the legs 328 may be determined based on a height of the mobile drive unit 20.

The docking surface 350 comprises a portion of the inventory holder 30 that couples to, abuts, and/or rests upon a portion of the platform 110, when the mobile drive unit 20 is docked to the inventory holder 30. Additionally, the docking surface 350 supports a portion or all of the weight of the inventory holder 30 while the inventory holder 30 is docked with the mobile drive unit 20. The composition, shape, and/or texture of the docking surface 350 may be designed to facilitate maneuvering of the inventory holder 30 by the mobile drive unit 20. For example, as noted above, in some examples, the docking surface 350 may comprise a high-friction portion. When the mobile drive unit 20 and the inventory holder 30 are docked, frictional forces induced between the platform 110 and this high-friction portion may allow the mobile drive unit 20 to maneuver the inventory holder 30. In some examples, dynamically adjusting a mounting angle of the platform 110 may provide increased traction between the docking surface 350 and the platform 110 because the mounting angle may be optimized for stability of the inventory holder 30. Additionally, in some examples, the docking surface 350 may include appropriate components suitable to receive a portion of the platform 110, couple the inventory holder 30 to the mobile drive unit 20, and/or facilitate control of the inventory holder 30 by the mobile drive unit 20.

Holder identifier 360 marks a predetermined portion of the inventory holder 30 and the mobile drive unit 20 may use the holder identifier 360 to align with the inventory holder 30 during docking and/or to determine the location of the inventory holder 30. More specifically, in some examples, the mobile drive unit 20 may be equipped with components, such as the holder sensor 150, that can detect the holder identifier 360 and determine its location relative to the mobile drive unit 20. As a result, the mobile drive unit 20 may be able to determine the location of the inventory holder 30 as a whole. For example, in some examples, the holder identifier 360 may represent a reflective marker that is positioned at a predetermined location on the inventory holder 30 and that the holder sensor 150 can optically detect using an appropriately-configured camera.

Depending on the configuration and characteristics of the mobile drive unit 20 and the material handling system 10, the mobile drive unit 20 may move the inventory holder 30 using a variety of appropriate methods. In a particular example, the mobile drive unit 20 is capable of moving the inventory holder 30 along a two-dimensional grid, combining movement along straight-line segments with ninety-degree rotations and arcing paths to transport the inventory holder 30 from the first location to the second location. Additionally, while moving, the mobile drive unit 20 may use fixed objects located in the workspace as reference points to assist in navigation. For example, in some examples, the material handling system 10 includes multiple fiducial marks. The mobile drive unit 20 may be configured to detect the fiducial marks and to determine the location of the mobile drive unit 20 and/or measure its movement based on the detection of the fiducial marks.

After the mobile drive unit 20 arrives at the second location, the mobile drive unit 20 may perform appropriate operations to facilitate access to inventory items 40 stored in the inventory holder 30. For example, the mobile drive unit 20 may rotate the inventory holder 30 to present a particular face of the inventory holder 30 to an operator of the material handling system 10 or other suitable party, such as a packer selecting the inventory items 40 from the inventory holder 30. The mobile drive unit 20 may also undock from the inventory holder 30. Alternatively, instead of undocking at the second location, the mobile drive unit 20 may transport the inventory holder 30 back to the first location or to a third location after any appropriate actions have been taken involving the inventory items 40. For example, after a packer has removed particular inventory items 40 from the inventory holder 30, the mobile drive unit 20 may return the inventory holder 30 to its original storage location, a new storage location, or another inventory station. The mobile drive unit 20 may then undock from inventory holder 30 at this new location.

Figure 7:
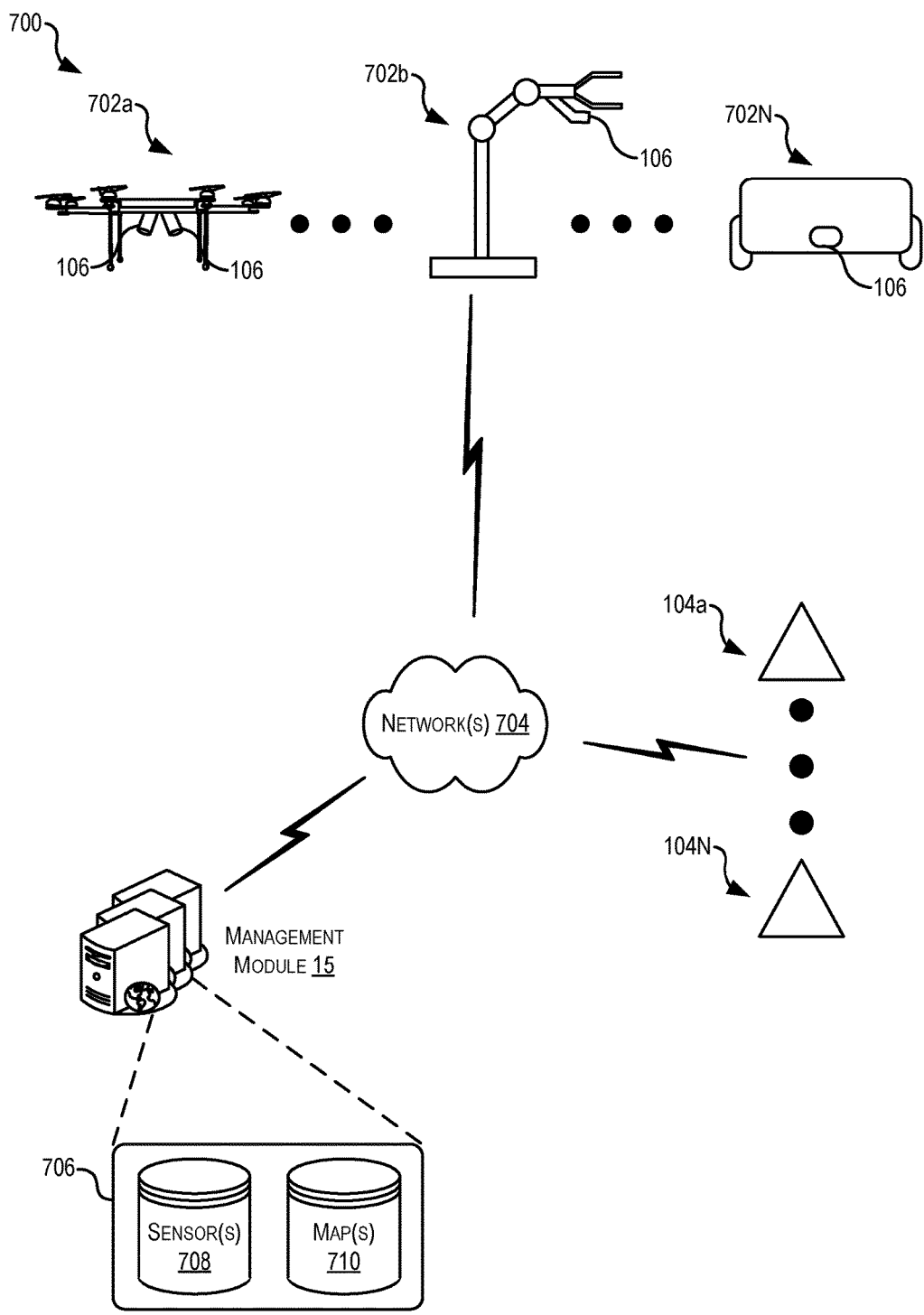
FIG. 7 illustrates an example schematic architecture and devices relating to gathering visual information using combinations of fixed sensors and on-demand sensors, according to at least one example.

As introduced above, examples herein are directed to, among other things, systems and techniques relating to gathering visual information using combinations of fixed sensors and/or on-demand sensors. To this end, FIG. 7 illustrates an example schematic architecture 700 and devices, according to at least one example. The architecture 700 includes an example of the management module 15, automated devices 702a and 702b-702N, and fixed sensors 104a-104N.

The management module 15 may be associated with an electronic marketplace (not shown) and interface with purchase and delivery services of the electronic marketplace. In this manner, the management module 15 may coordinate storage, retrieval, tracking, packaging, and the like of items offered by the electronic marketplace. In some examples, the management module 15 may be a stand-alone service devoted to implementing the techniques described herein.

The management module 15 may be in communication with the automated devices 702 and the fixed sensors 104 via one or more network(s) 704 (hereinafter, "the network 704"). The network 704 may include any one or a combination of many different types of networks, such as cable networks, the Internet, wireless networks, cellular networks, radio networks, and other private and/or public networks.

As described herein, the management module 15 may include may include at least one memory and one or more processing units (or processor(s)). The processor(s) may be implemented as appropriate in hardware, computer-executable instructions, software, firmware, or combinations thereof. Computer-executable instruction, software, or firmware implementations of the processor(s) may include computer-executable or machine-executable instructions written in any suitable programming language to perform the various functions described. The memory may include more than one memory and may be distributed throughout the management module 15. The memory may store program instructions that are loadable and executable on the processor(s), as well as data generated during the execution of these programs.

Depending on the configuration and type of memory, the memory may be volatile (such as random access memory (RAM)) and/or non-volatile (such as read-only memory (ROM), flash memory, or other memory). The management module 15 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory may include multiple different types of memory, such as static random access memory (SRAM), dynamic random access memory (DRAM), or ROM.

The management module 15 may also include a data store 706. The data store 706 may include one or more databases, tables, data structures, or the like for storing and/or retaining information associated with implementation of the techniques described herein. In some examples, the data store 706 may include databases, such as a sensor database 708 and a maps database 710.

The sensor database 708 may be configured to store information about the sensors described herein. In each sensor record in the sensor database 708 may be associated position information (e.g., two or three-dimensional coordinates of fixed sensors and last known coordinates of on-demand sensors), orientation information, calibration information, field of view information, sensor type (e.g., fixed, fixed on-demand, mobile on-demand, etc.), automated device information (e.g., what type of automated device is associated with the sensor), operational status indicator, and/or any other suitable information. In some examples, the management module 15 may access the sensor database 708 as part of performing the techniques described herein.

The maps database 710 may be configured to store information about maps generated, maintained, and updated by the management module 15. This may include resolution information corresponding to different regions of the map. The maps database 710 may be implemented using a map database management system designed to efficiently store and recall spatial information. In some examples, the maps may include two-dimensional and/or three-dimensional representations of the workspace 70.

Turning now to the automated devices 702. The automated devices 702 illustrated are examples of such devices that can be used to transport on-demand sensors 106. For example, the automated device 702*a* is an aerial vehicle which can include one or more on-demand sensors 106. In some examples, the one or more on-demand sensors 106 of the automated device 702*a* are primarily used by the automated device 702*a* for navigation or other flight-based tasks. When requested, however, the on-demand sensors 106 of the automated device 702*a* may be used by the automated device 702*a* for performance of the techniques described herein (e.g., collecting additional visual information at a particular location). The automated device 702*a* can be instructed and/or process instructions to determine how to position itself so as to orient the on-demand sensor 106 at an appropriate location and view angle for collecting the additional visual information. In some examples, the automated device 702*a* can also be instructed and/or process instructions to determine how to move the on-demand sensor 106 (e.g., sweep side-to-side, sweep up-and-down, zoom towards a focal point and away from a focal point, etc.) to further collect the additional visual information.

The aerial vehicle 702*a* may be designed in accordance with commercial aviation standards and may include multiple redundancies to ensure reliability. For purposes of this specification, the aerial vehicle 702*a* may include a plurality of systems or subsystems operating under the control of, or at least partly under the control of, the management module 15. The aerial vehicle 702*a* may include an aerial vehicle management device (e.g., an onboard computer) for autonomously or semi-autonomously controlling and managing the aerial vehicle 702*a* and, in some examples, for enabling remote control by a pilot. For example, the management module 15 may provide an instruction for execution by the aerial vehicle management device. The aerial vehicle management device, may be housed under top cover of the aerial vehicle 702*a*. As used herein, the management system may include a power supply and assemblies (e.g., rechargeable battery, liquid fuel, and other power supplies) (not shown), one or more communications links and antennas (e.g., modem, radio, network, cellular, satellite, and other links for receiving and/or transmitting information) (not shown), one or more navigation devices and antennas (e.g., global positioning system (GPS), inertial navigation system (INS), range finder, Radio Detection And Ranging (RADAR), and other systems to aid in navigating the aerial vehicle 702*a* and detecting objects) (not shown), radio-frequency identification (RFID) capability (not shown), and interfaces capable of speech interpretation and recognition (not shown).

The aerial vehicle 702*a* may also include a communication system housed within the top cover. The communication system may include one or more light sensors (e.g., imaging device, depth sensor, visible light camera, infrared camera, RGB camera, depth aware camera, infrared laser projector, ultraviolet sensitive cameras, scanning sensor, light filters and any combination of the foregoing), one or more auditory sensors (e.g., microphone, noise filters, and other sensors for capturing sound), and one or more output devices (e.g., microphone, speaker, laser projector, light projector, and other devices for outputting communication information). In some examples, the light sensors include one or more image capture devices. These fixed sensors 104 may be selected from these or other sensors. For example, a pair of stereo cameras (e.g., the on-demand sensors 106) may be used to provide three-dimensional vision.

Further, the aerial vehicle 702*a* may include a propulsion system. In some examples, the propulsion system may include rotary blades or otherwise be a propeller-based system. As illustrated in FIG. 7, the propulsion system may include a plurality of propulsion devices, a few of which are shown in this view. Each propulsion device may include one or more propellers, a motor, wiring, a balance system, a control mechanism, and other features to enable flight. In some examples, the propulsion system may operate at least partially under the control of the aerial vehicle management device. In some examples, the propulsion system may be configured to adjust itself without receiving instructions from the aerial vehicle management device. Thus, the propulsion system may operate semi-autonomously or autonomously. The propulsion system may enable multi-directional flight of the aerial vehicle 702*a* (e.g., by adjusting each propulsion device individually). In some examples, the aerial vehicle 702*a* may be a fixed-wing unmanned aerial vehicle.

The aerial vehicle 702*a* may also include a landing structure. The landing structure may be adequately rigid to support the aerial vehicle 702*a*. The landing structure may include a plurality of elongated legs which may enable the aerial vehicle 702*a* to land on and take off from a variety of different surfaces. The plurality of systems, subsystems, and structures of the aerial vehicle 702*a* may be connected via frame. The frame may be constructed of a rigid material and be capable of receiving, via different connections, the variety of systems, sub-systems, and structures. For example, the landing structure may be disposed below the frame and, in some examples, may be formed from the same material and/or same piece of material as the frame. The propulsion system may be disposed radially around a perimeter of the frame or otherwise distributed around the frame.

The automated device 702b is a robotic manipulator which can also include one or more on-demand sensors 106. In some examples, the one or more on-demand sensors 106 of the automated device 702b are primarily used by the automated device 702b for performance of manipulation tasks (e.g., identifying and manipulating items). When requested, however, the on-demand sensors 106 of the automated device 702b may be used by the automated device 702b for performance of the techniques described herein (e.g., collecting additional visual information at a particular location). The automated device 702b can be instructed and/or process instructions to determine how to position itself so as to orient the on-demand sensor 106 at an appropriate location and view angle for collecting the additional visual information. In some examples, the automated device 702b can also be instructed and/or process instructions to determine how to move the on-demand sensor 106 (e.g., sweep side-to-side, sweep up-and-down, zoom towards a focal point and away from a focal point, etc.) to further collect the additional visual information.

The automated device 702N is a mobile drive unit 20 which can also include one or more on-demand sensors 106 in addition to those described herein. In some examples, the function of the one or more on-demand sensors 106 is performed by one or more of the other sensors described herein. In some examples, the one or more on-demand sensors 106 of the automated device 702N are primarily used by the automated device 702N for performance of mobile drive unit tasks. When requested, however, the on-demand sensors 106 of the automated device 702N may be used by the automated device 702N for performance of the techniques described herein (e.g., collecting additional visual information at a particular location). The automated device 702N can be instructed and/or process instructions to determine how to position itself so as to orient the on-demand sensor 106 at an appropriate location and view angle for collecting the additional visual information. In some examples, the automated device 702N can also be instructed and/or process instructions to determine how to move the on-demand sensor 106 (e.g., sweep side-to-side, sweep up-and-down, zoom towards a focal point and away from a focal point, etc.) to further collect the additional visual information. The fixed sensors 104a-104N are described in detail elsewhere herein.

Figure 8:
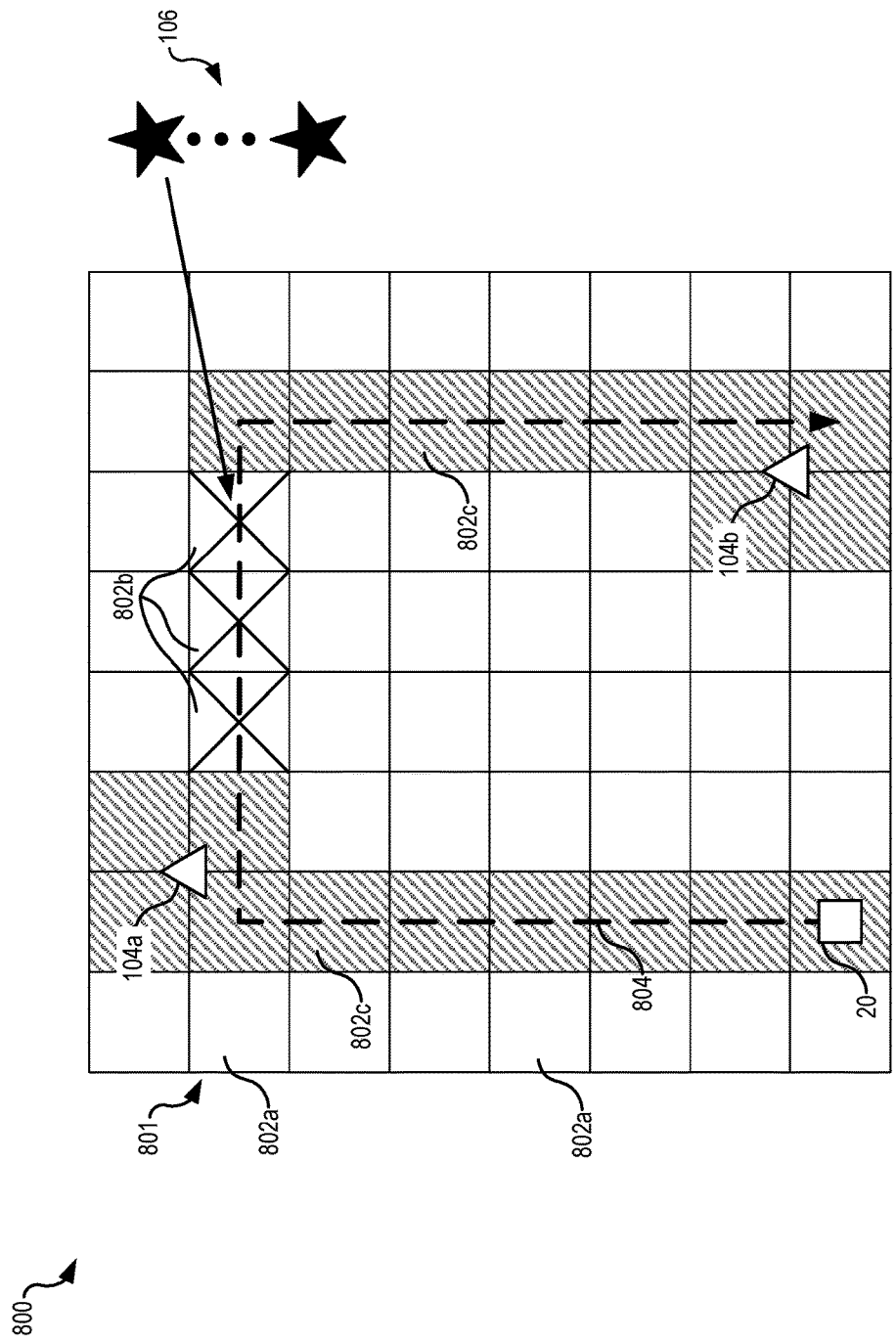
FIG. 8 illustrates a first state of an example workspace in which techniques relating to gathering visual information using combinations of fixed sensors and on-demand sensors may be implemented, according to at least one example.
Figure 9:
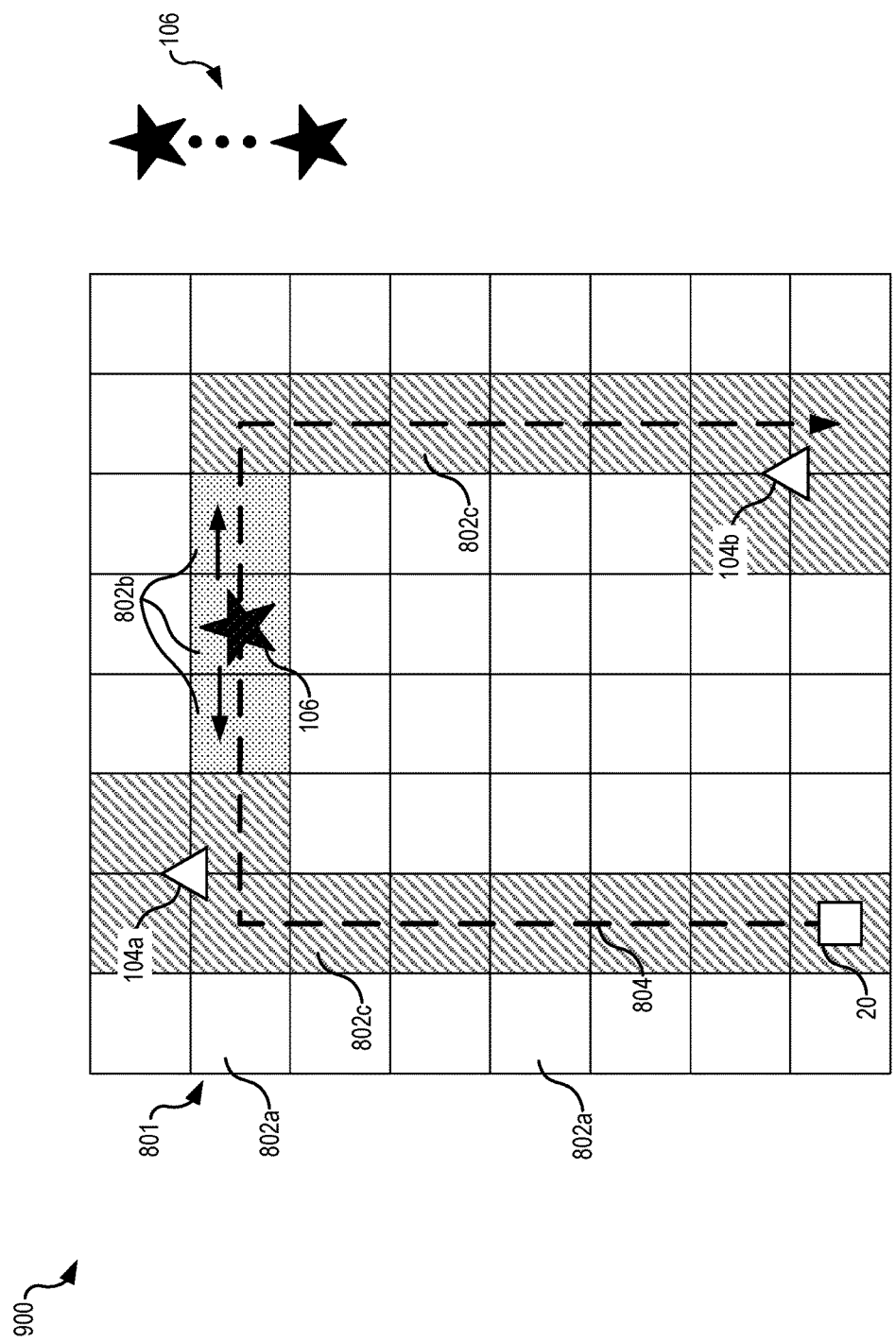
FIG. 9 illustrates a second state of the example workspace of FIG. 8, according to at least one example.

FIGS. 8 and 9 illustrate example states of an example workspace 800 in which techniques relating to gathering visual information using combinations of fixed sensors 104 and on-demand sensors 106 may be implemented, according to at least one example. In particular, FIGS. 8 and 9 illustrate an example technique for obtaining additional sensor information based on a route of a mobile drive unit. The workspace 800 is an example of the workspace 70 described herein.

In FIGS. 8 and 9, the workspace 800 is represented as a map 801 including a grid of equally-sized regions 802. The regions 802 correspond to similarly-sized and similarly-located physical areas of the workspace 800. The workspace 800 also includes fixed sensors 104 and a planned route 804 for the mobile drive unit 20. In some examples, the management module 15 may be configured to plan the route 804 for the mobile drive unit 20 based at least in part on sensor information collected by the fixed sensors 104 and/or other fixed sensors and/or on-demand sensors not shown in these figures. In some examples, the planned route 804 is part of an inventory task assigned to the mobile drive unit 20 by the management module 15.

Generally speaking, the planned route 804 may extend through regions 802c of the workspace 800 where suitable visual information is known. In the map 801, the regions 802c are depicted with a sloped fill pattern. The visual information may be considered suitable at least because of the currentness of the visual information (e.g., based on when it was last updated), the resolution of the visual information, and any other suitability factor. Other regions such as the regions 802a may represent areas in the workspace 800 where visual information is unknown and/or not currently needed for the mobile drive unit 20 to drive the planned route 804. Other regions such as the regions 802b may represent areas in the workspace 800 where visual information is needed and/or would be helpful for the mobile drive unit 20 to drive the planned route 804. In particular, the planned route 804 may extend through three areas of the workspace 800 represented by the 802b regions. Using the techniques described herein, one or more of the on-demand sensors 106 may be deployed to collect additional sensor information at the areas of the workspace 800 corresponding to the regions 802b. For example, as illustrated in FIG. 9, the on-demand sensor 106 has navigated to the areas of the workspace 800 corresponding to the regions 802b and collected additional sensor information such that regions 802b are now represented in the map 801 by a different dotted fill pattern. In some examples, this fill pattern may represent that the visual information for the regions 802b was collected using the on-demand sensor 106 as opposed to one of the fixed sensors 104.

The on-demand sensor 106 may be deployed to the areas corresponding to the regions 802b based at least in part on a request from the mobile drive unit 20, a request from the management module 20, and/or based at least in part on detection of a triggering condition. In some examples, the regions 802 are updated in the map 801 at different update frequencies, which may depend on the corresponding areas of the workspace 800. For example, areas where inventory items are stored may be updated less frequently than areas that includes roadways, paths, or inventory stations. In some examples, the regions 802 may be represented by visual information having different resolution values. For example, the regions 802 corresponding to high traffic areas in the workspace 800 may be of higher resolution than the regions 802 corresponding to low traffic areas in the workspace 800.

Figure 10:
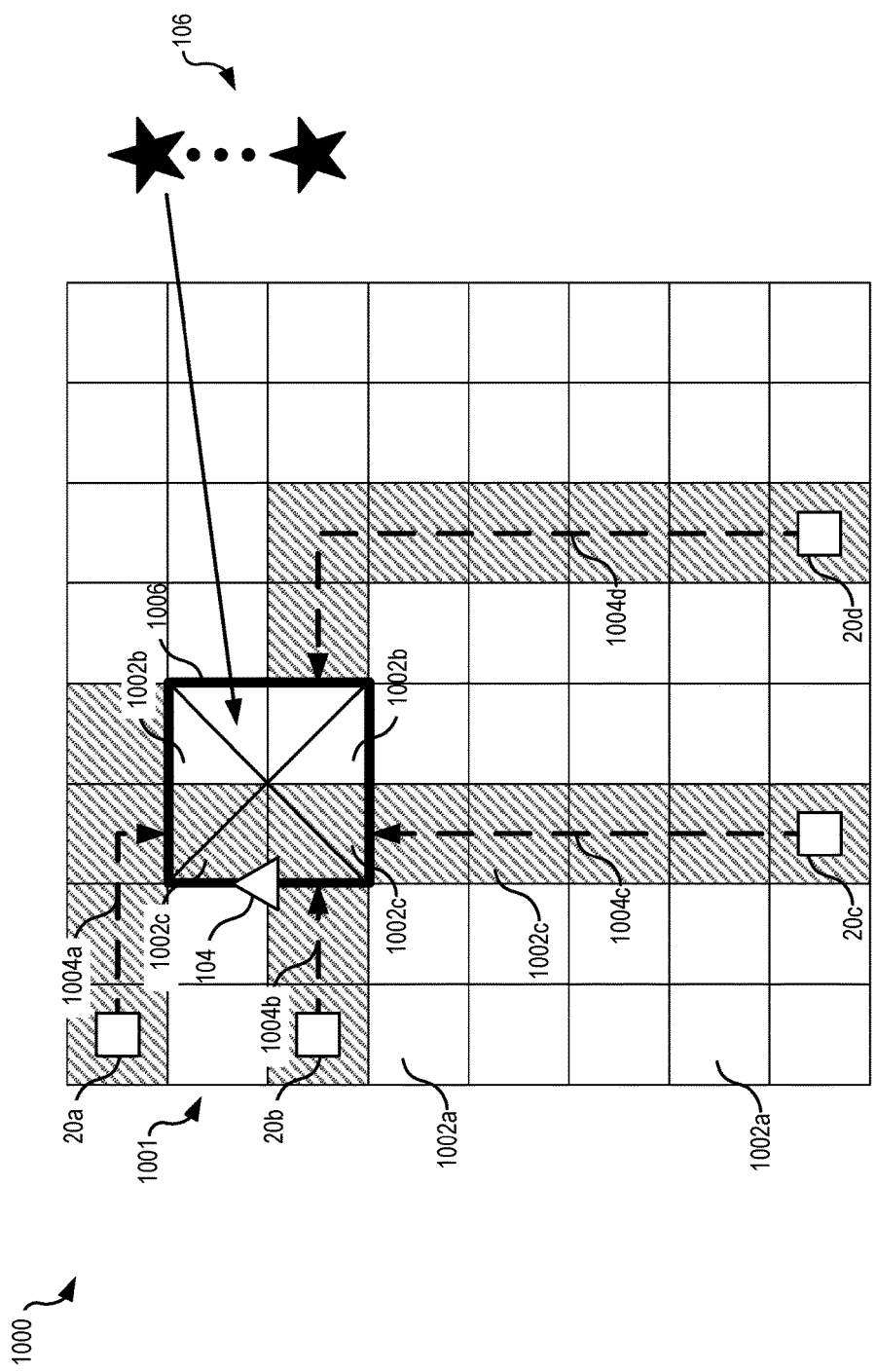
FIG. 10 illustrates a first state of an example workspace in which techniques relating to gathering visual information using combinations of fixed sensors and on-demand sensors may be implemented, according to at least one example.
Figure 11:
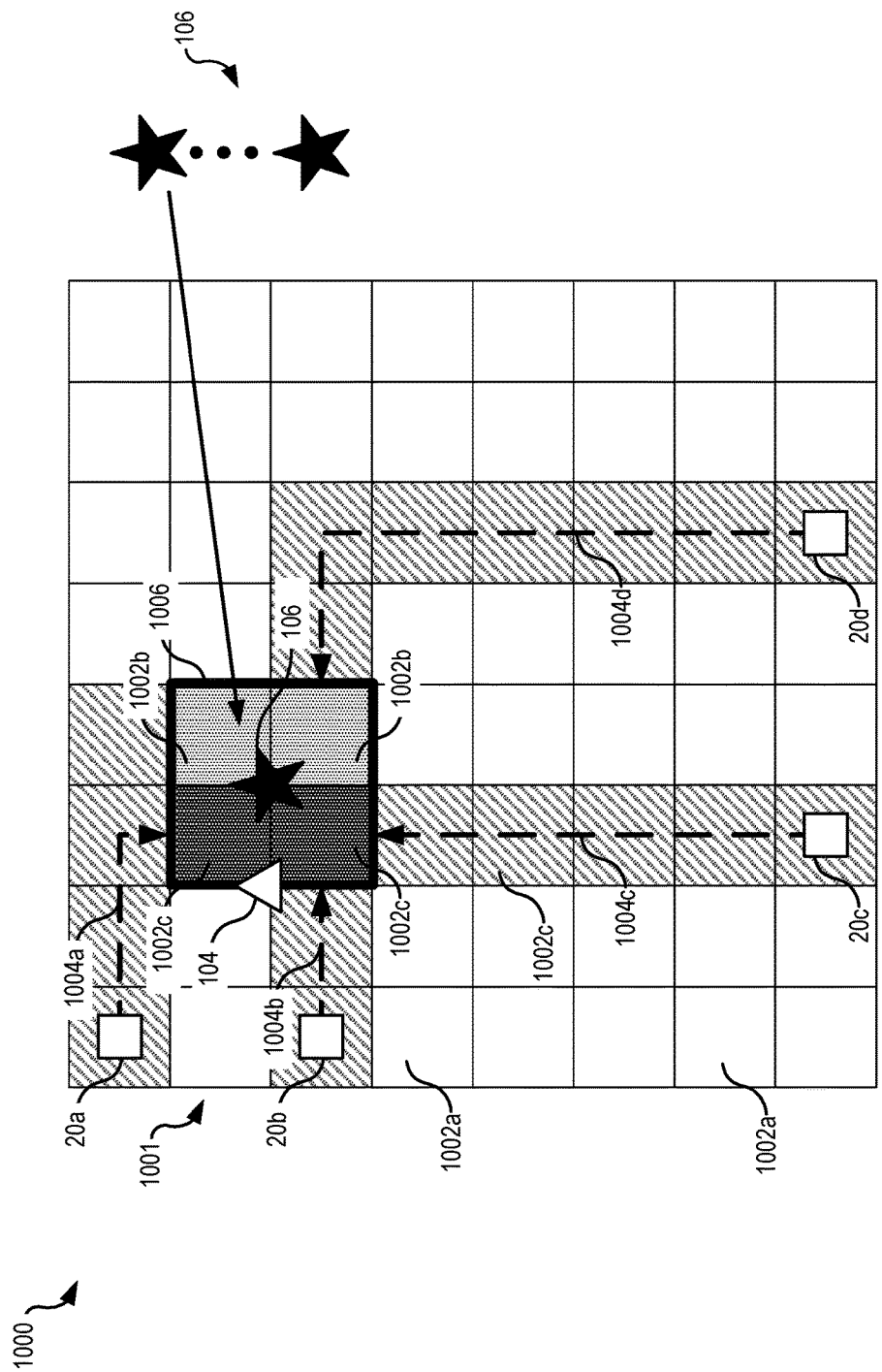
FIG. 11 illustrates a second state of the example workspace of FIG. 10, according to at least one example.

FIGS. 10 and 11 illustrate example states of an example workspace 1000 in which techniques relating to gathering visual information using combinations of fixed sensors 104 and on-demand sensors 106 may be implemented, according to at least one example. In particular, FIGS. 10 and 11 illustrate an example technique for obtaining additional sensor information in an area of congestion (e.g., an intersection of a plurality of mobile drive units 20) within the workspace 1000. The workspace 1000 is an example of the workspace 70 described herein. In some examples, the area of congestion may be determined by computing a future mobile drive unit density value for the area given some future time period. For example, the number of mobile drive units that are expected at the intersection within a 1 minute window can be computed. If this density value exceeds some density threshold (e.g., 3 mobile drive units), the additional sensor information may be collected and used to improve the likelihood that the mobile drive units 20 navigate the intersection efficiently and quickly.

In FIGS. 10 and 11, the workspace 1000 is represented as a map 1001 including a grid of equally-sized regions 1002. The regions 1002 correspond to similarly-sized and similarly-located physical areas of the workspace 1000. The workspace 1000 also includes fixed sensors 104 and a plurality of planned routes 1004 for the mobile drive units 20. In some examples, the management module 15 may be configured to plan the planned routes 1004 for the mobile drive units 20 based at least in part on sensor information collected by the fixed sensors 104 and/or other fixed sensors and/or on-demand sensors not shown in these figures. In some examples, the planned routes 1004 are part of inventory tasks assigned to the mobile drive unit 20 by the management module 15.

Generally speaking, the planned routes 1004 may extend through areas of the workspace 1000 represented by the regions 1002c of the map 1001 where suitable visual information is known. In the map 1001, the regions 1002c are depicted with a sloped fill pattern. The visual information may be considered suitable at least because of the currentness of the visual information, the resolution of the visual information, and any other suitability factor. Other regions such as the regions 1002a may represent areas in the workspace 1000 where visual information is unknown and/or not currently needed for the mobile drive unit 20 to drive the planned routes 1004. Other regions such as the regions 1002b may represent areas in the workspace 1000 where visual information is needed and/or would be helpful for the mobile drive units 20 to drive the planned routes 1004. In particular, the planned routes 1004 may all converge at an intersection 1006. Using the techniques described herein, one or more of the on-demand sensors 106 may be deployed to collect additional sensor information at areas in the workspace 1000 corresponding to the regions 1002b and/or the regions 1002c that are within the intersection 1006.

For example, as illustrated in FIG. 11, the on-demand sensor 106 has navigated to the intersection 1006 and collected additional sensor information at the corresponding areas of the workspace 1000 such that the regions 1002b and the regions 1002c within the intersection 1006 are now represented by different dotted fill patterns. In some examples, the fill pattern in the regions 1002c may represent an enhanced representation of the regions 1002c that is based on sensor information from the fixed sensor 104 and the on-demand sensor 106. The fill pattern in the regions 1002 may represent that visual information for the areas in the workspace 1000 corresponding to the regions 1002b was collected using the on-demand sensor 106 as opposed to one of the fixed sensors 104.

The on-demand sensor 106 may be deployed to the areas in the workspace 1000 corresponding to the regions 1002b based at least in part on a request from the mobile drive unit 20, a request from the management module 20, and/or based at least in part on detection of a triggering condition. In some examples, the regions 1002 are updated in the map 1001 at different update frequencies, which may depend on the corresponding areas of the workspace 1001. In some examples, the regions 1002 may be represented by visual information having different resolution values. In some examples, the plurality of planned routes 1004 may be analyzed to determine one or more areas of the workspace 1000 of future congestion such as the intersection 1006. Based on this determination, the on-demand sensors 106 may be deployed to gather additional information to get a closer look at the intersection 1006. This may be helpful to adjust the planned routes 1004, including speeds and directions of the mobile drive units 20 in order to optimize movement of the mobile drive units 20 through the intersection 1006.

Figure 12:
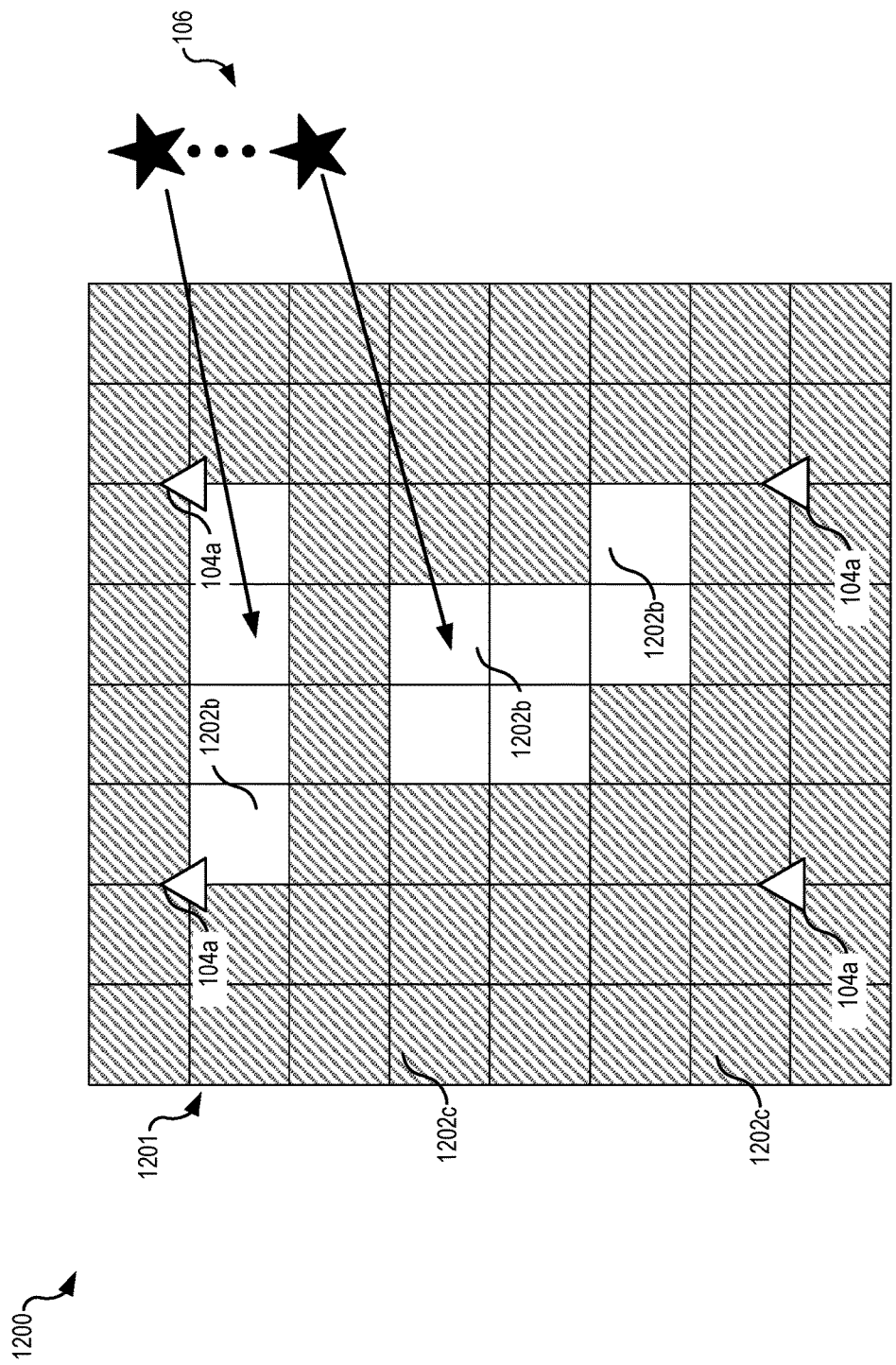
FIG. 12 illustrates a first state of an example workspace in which techniques relating to gathering visual information using combinations of fixed sensors and on-demand sensors may be implemented, according to at least one example.
Figure 13:
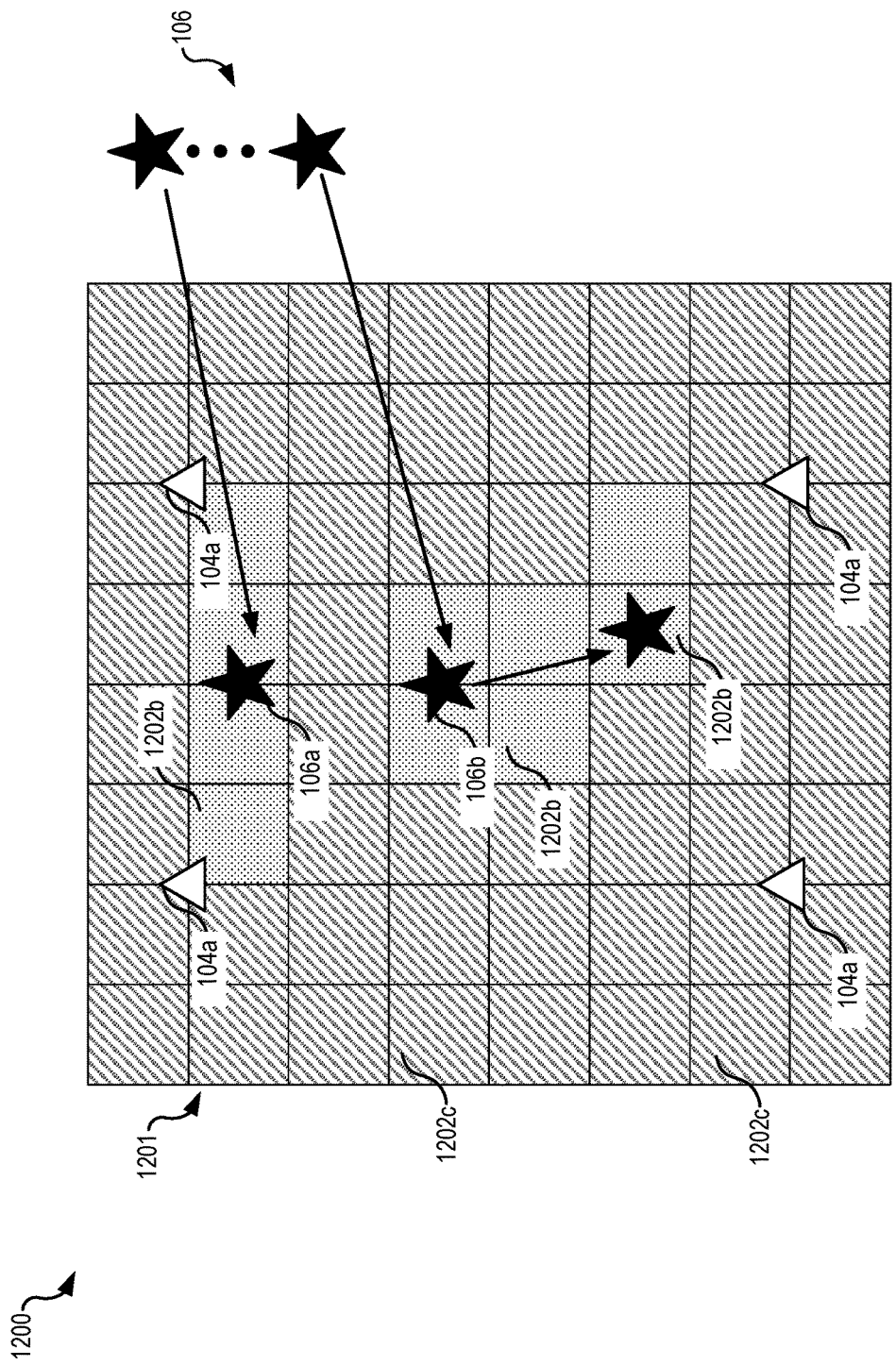
FIG. 13 illustrates a second state of the example workspace of FIG. 12, according to at least one example.

FIGS. 12 and 13 illustrate example states of an example workspace 1200 in which techniques relating to gathering visual information using combinations of fixed sensors 104 and on-demand sensors 106 may be implemented, according to at least one example. In particular, FIGS. 12 and 13 illustrate an example technique for maintaining a map 1201 of the workspace 1200 based on sensor information from the fixed sensors 104 and/or the on-demand sensors 106. The map 1201, in some examples, may be considered a global view map because it may globally represent the workspace 1200. The workspace 1200 is an example of the workspace 70 described herein.

In FIGS. 12 and 13, the workspace 1200 is represented as the map 1201 including a grid of equally-sized regions 1202. The regions 1202 correspond to similarly-sized and similarly-located physical areas of the workspace 1200. The workspace 1200 also includes fixed sensors 104. The regions 1202c may be regions of the map 1201 where suitable visual information is known. The regions 1202c are depicted with a sloped fill pattern. The visual information may be considered suitable at least because of the currentness of the visual information, the resolution of the visual information, and any other suitability factor. Other regions such as the regions 1202b may represent areas in the workspace 1200 where visual information is unknown and/or required for keeping the map 1201 current. In some examples, the management module 15 may maintain the map 1201 and deploy the on-demand sensors 106 to gather additional sensor information, when needed.

For example, as illustrated in FIG. 13, the on-demand sensors 106a, 106b have navigated to the areas of the workspace 1200 corresponding to the regions 1202b and collected additional sensor information such that the regions 1202b are now represented by different dotted fill patterns. In some examples, the fill pattern in the regions 1202b may represent that visual information for the areas of the workspace 1200 corresponding to the regions 1202b was collected using the on-demand sensors 106 as opposed to one of the fixed sensors 104. In some examples, the additional sensor information collected by the on-demand sensors 106 may be of a different resolution than the other sensor information. In some examples, the additional sensor information may be combined with the sensor information from the fixed sensors 104.

The on-demand sensors 106 may be deployed to the areas of workspace 1200 corresponding to the regions 1202b based on fulfillment of one or more different conditions. For example, versions of the map 1201 and/or versions of portions of the map 1201 collected at different times may be maintained by the management module 15. For example, a first version can be generated based on first visual information collected from sensors at a first time. A second version can be generated based on second visual information collected from sensors at a second, later time. The versions can be compared (e.g., using image processing techniques) to each other to identify differences between the versions. These differences may represent physical changes that have occurred in the workspace 1200 between the first time and the second time. For example, an obstruction that has fallen on a mobile drive unit route at a time between the first time and the second time may be detected. Based on this, the on-demand sensor 106 can be deployed to a location in the workspace 1200 where the obstruction was detected. At the location, the on-demand sensor 106 can obtain higher resolution visual information at the area. This can be used to update a corresponding region in the map 1201.

A confidence measure may be compared to a confidence threshold to determine whether to deploy the on-demand sensors 106. A confidence measure may be specific to each region 1202, a group of regions 1202, and/or the entire map 1201. A confidence measure may be based in part on a resolution value for each region 1202 (e.g., a pixel density for the region), an age value for each region 1202 (e.g., when the region 1202 was last updated), and/or a frequency value for the region 1202 (e.g., how often the region 1202 is updated). The confidence measure represents whether the visual information in the respective region 1202 can be relied upon. Different confidence thresholds may be established depending on what device is planning to use the visual information and/or what the intended purpose is of the visual information.

In some examples, the regions 1202 are updated in the map 1201 at different update frequencies, which may depend on the corresponding areas of the workspace 1201. In some examples, the regions 1202 may be represented by visual information having different resolution values.

The on-demand sensors 106a, 106b may be deployed to the regions 1202b based at least in part on a request from the management module 15 and/or in any other suitable manner.

Figure 14:
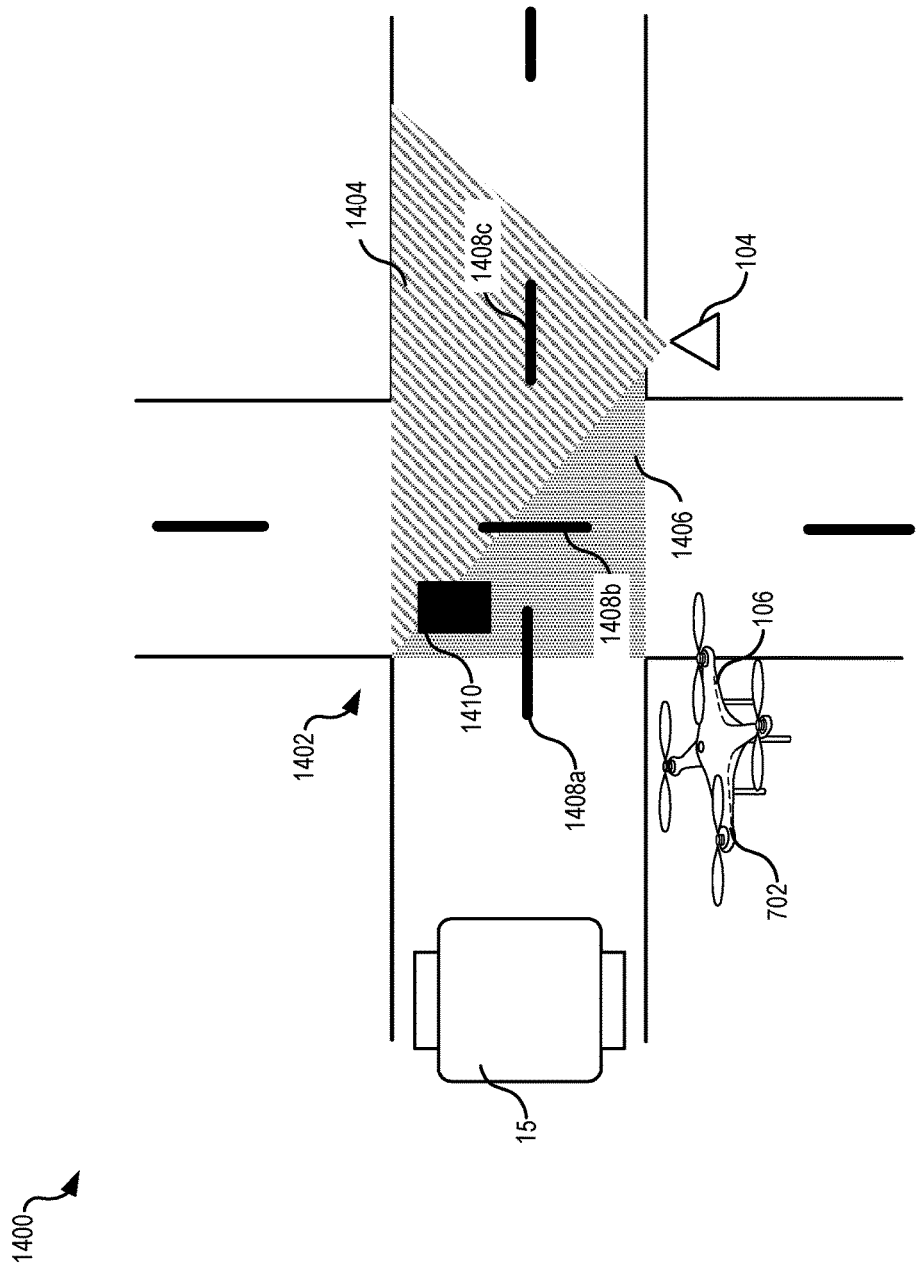
FIG. 14 illustrates an example workspace in which techniques relating to gathering visual information using combinations of fixed sensors and on-demand sensors may be implemented, according to at least one example.

FIG. 14 an example workspace 1400 in which techniques relating to gathering visual information using combinations of fixed sensors 104 and on-demand sensors 106 may be implemented, according to at least one example. In particular, FIG. 14 illustrates an example intersection 1402 where fixed sensor information 1404 and on-demand sensor information 1406 can be used to obtain an enhanced representation of conditions present at the intersection 1402. The workspace 1400 is an example of the workspace 70 described herein.

The fixed sensor 104 may be used to continuously monitor the intersection 1402. This may be because the fixed sensor 104 is fixed at a position adjacent to the intersection 1402. An example range of the fixed sensor 104 is illustrated as the fixed sensor information 1404. Thus, the fixed sensor 104 may be capable of viewing most, but not all of the intersection 1402. The on-demand sensor 1406 may be selectively called to provide additional monitoring of the intersection 1402. An example range of the on-demand sensor 106 is illustrated as the on-demand sensor information 1406. It should be understood, however, that because the on-demand sensor 106 is connected to the automated device 702 (e.g., an unmanned aerial vehicle), the range of the on-demand sensor 106 may be variable.

One condition present at the intersection 1402 is an obstruction 1410. In some examples, the management module 15 using the fixed sensor information 1404 may have identified the presence of the obstruction 1410, but may not have been able to identify the extents of the obstruction because of its limited range. Based on this identification, the management module 15 may cause the automated device 702 to gather additional sensor information at the intersection 1402. This additional sensor information may be, in some examples, the on-demand sensor information 1406.

In some examples, the automated device 702 may navigate to the intersection 1402, cause the on-demand sensor 106 to collect the on-demand sensor information 1406, and share the on-demand sensor information 1406 with the management module 15 for processing. Such processing may include further identifying the obstruction 1410, identifying properties of the obstruction 1410, determining whether the mobile drive unit 20 can proceed through the intersection 1402 despite the presence of the obstruction 1410, combining the fixed sensor information 1404 with the on-demand sensor information 1406 to create a digital representation of the intersection 1402.

The intersection 1402 includes a plurality of visible indicia 1408. These indicia 1408 can be used to create the digital representation of the intersection 1402. In some examples, the visible indicia 1408 are examples of fiducial marks that the mobile drive units 20 use to navigate within the workspace 1400. In this manner, the position and orientation of the visible indicia 1408 within the workspace 1400 may be known. In some examples, the position and orientation of the visible indicia 1408 are global with respect to a common point in the workspace and/or may be relative to positions and orientations of other known objects. In any event, the visible indicia 1408 may be detected from the fixed sensor information 1404 and from the on-demand sensor information 1406. Because the positions and orientations are known of the visible indicia 1408, the visible indicia 1408 may be used to fuse the two information sets together to create a complete digital representation of the intersection 1402.

Figure 15:
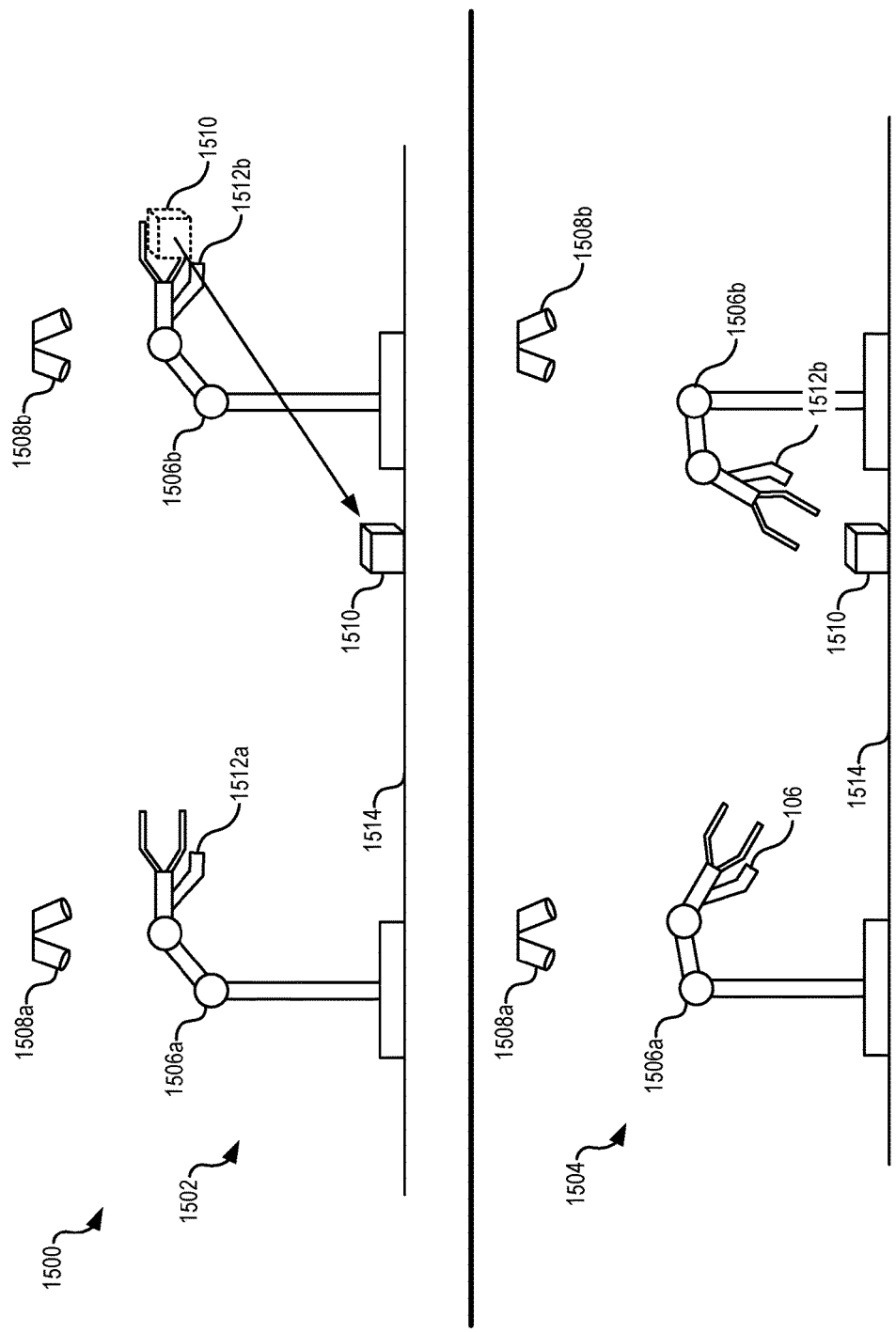
FIG. 15 illustrates an example workspace in which techniques relating to gathering visual information using combinations of fixed sensors and on-demand sensors may be implemented, according to at least one example.

FIG. 15 illustrates two views, 1502 and 1504, of example workspace 1500 in which techniques relating to gathering visual information using combinations of fixed sensors 104 and on-demand sensors 106 may be implemented, according to at least one example. The view 1502 illustrates a pair of robotic manipulators 1506a, 1506b. The robotic manipulators 1506 may be disposed adjacent to each other within the workspace 1500. For example, the robotic manipulators 1506 may be configured to manipulate items with respect to a moving conveyor belt, to and from inventory holders, and/or to perform any other suitable task. The workspace 1500 is an example of the workspace 70 described herein.

Irrespective of the task, each of the robotic manipulators 1506 may include a fixed sensor package 1508. The fixed sensor package 1508, which is an example of the fixed sensor 104, may include any suitable combination of optical sensors for use by the robotic manipulator 1506 to identify and manipulate items (e.g., an item 1510).

Each robotic manipulator 1506 may also include an arm sensor package 1512. The arm sensor package 1512, which is an example of the on-demand sensor 106, may include any suitable combination of optical sensors for use by the robotic manipulator 1506 to identify and manipulate items.

Turning now to the view 1502, in this view, the item 1510 has fallen from the grasp of the robotic manipulator 1506b (e.g., illustrated by the dashed line) to a location on a surface 1514, as illustrated by the arrow. A controller of the robotic manipulator 1506b and/or the management module 15 may use the fixed sensor package 1508b and/or the arm sensor package 1512 to search for the item 1510. In this example, it is assumed that this search does not reveal the item 1510 (e.g., because the item 1510 has fallen out of the fields of view of the sensors, 1508, 1512).

Because the robotic manipulator 1506b cannot find the item 1510, the robotic manipulator 1506b can send a request to the management module 15 for assistance searching for the item 1510. The request may indicate characteristics about the item 1510, when it was dropped, an approximate location, and other relevant contextual details. Based on the request, the management module 15 can identify an on-demand sensor to assist with the search. In this example, the management module 15 has identified the robotic manipulator 1506a including the arm sensor package 1512a and the fixed sensor package 1508a as likely sensors for identifying the item 1510. Thus, the management module 15 may use one or more of the sensor packages 1508a, 1512a to search for the item 1510.

As illustrated in the view 1504, based on this instruction from the management module 15, the robotic manipulator 1506a has articulated its arm to orient the arm sensor package 1512a in a manner that can be used to identify the item 1510. Once identified, as further illustrated in the view 1504, sensor information provided by the arm sensor package 1512a can be used to generate a manipulation strategy for the robotic manipulator 1506b to pick the item 1510 up from the surface 1514. In this manner, the sensor information about an item and collected by a sensor of a first robotic manipulator can be used by a second robotic manipulator to manipulate the item.

FIGS. 16, 17, 18, 19, 20, and 21 illustrate example flow diagrams showing respective processes 1600, 1700, 1800, 1900, 2000, and 2100 as described herein. The processes 1600, 1700, 1800, 1900, 2000, and 2100 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

Figure 16:
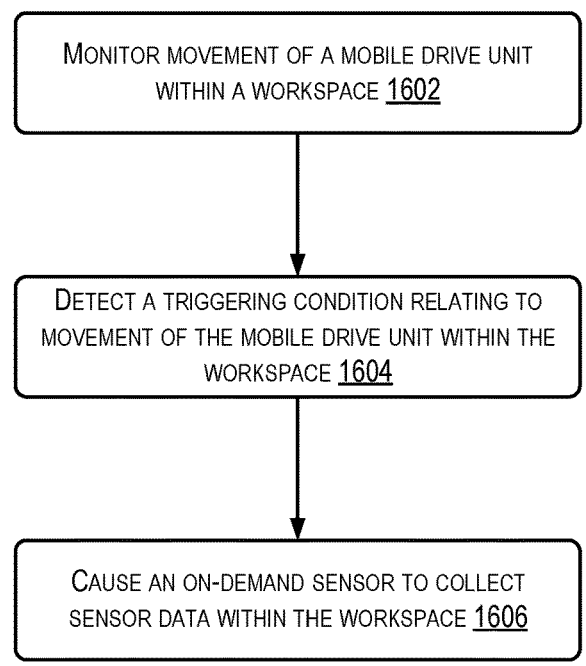
FIG. 16 illustrates an example flow diagram depicting example acts for implementing techniques relating to gathering visual information using combinations of fixed sensors and on-demand sensors, according to at least one example.

FIG. 16 illustrates a flow diagram depicting the process 1600 for implementing techniques relating to gathering visual information using combinations of fixed sensors and on-demand sensors, according to at least one example. The management module 16 (FIG. 3) may perform the process 1600 of FIG. 16.

The process 1600 may begin at 1602 by monitoring movement of a mobile drive unit within a workspace. In some examples, monitoring movement may be based at least in part on first sensor information received from a fixed sensor. In some examples, the fixed sensor is positioned at a particular location within the workspace. The first sensor information may include a representation of a fixed location where the fixed sensor is located.

Monitoring movement may include computing routes for the mobile drive unit, determining whether visual information is available along the route, and tracking progress of the mobile drive unit along the route.

In some examples, the first sensor information is received from a first onboard sensor of the mobile drive unit, a second onboard sensor of an unmanned aerial vehicle movable within the workspace, or a fixed sensor disposed at a fixed location within the workspace.

At 1604, the process 1600 may include detecting a triggering condition relating to movement of the mobile drive unit within the workspace. The triggering condition may be based at least in part on sensor information received from on-board sensors of the mobile drive unit. This sensor information may indicate conditions experienced by the mobile drive unit. For example, the sensor information may indicate slippage of the mobile drive unit's drive wheels while driving in the workspace. A location in the workspace may be determined based on where the slippage occurred. If other mobile drive units experience similar slippage at this location, it may be evidence of a spill or other change in floor conditions that would warrant further insight (e.g., by calling an on-demand sensor to collect additional information at the location). As an additional example, the triggering condition may relate to a planned route of the mobile drive unit. For example, the triggering condition may be met when the process 1600 determines that, based on a planned route of the mobile drive unit, that an obstruction exists along the planned route or simply that a portion of the route lacks visible information for the mobile drive unit to move quickly and efficiently along the route.

In some examples, the triggering condition may include at least one of a detected obstruction or a first request from the mobile drive unit for additional route information.

At 1606, the process 1600 may include causing an on-demand sensor to collect second sensor information at a particular location within the workspace. In some examples, causing the on-demand sensor to collect the second sensor information may be performed in response to detecting the triggering condition. The on-demand sensor may be a fixed on-demand sensor or a mobile on-demand sensor. In some example, the particular location may be associated with the triggering condition.

In some examples, the on-demand sensor is a mobile on-demand sensor connected to a different mobile drive unit or an unmanned aerial vehicle or a fixed on-demand sensor connected to a robotic manipulator.

In some examples, causing the on-demand sensor to collect the second sensor information can include causing the on-demand sensor to collect the second sensor information at a fixed location where a fixed sensor that output the first sensor information is located. In some examples, the second sensor information includes an enhanced representation of the fixed location.

In some examples, causing the on-demand sensor to collect the second sensor information can include causing the on-demand sensor to collect the second sensor information at a location that is different from a fixed location where the fixed sensor that output the first sensor information is located. In some examples, the second sensor information includes a second representation of the different location.

In some examples, causing the on-demand sensor to collect the second sensor information may include sending an automated device to which the on-demand sensor is connected to the particular location and instructions for orienting a view angle of the on-demand sensor to collect the second sensor information.

In some examples, the process 1600 may further include monitoring movement of a plurality of other mobile drive units within the workspace. In this example, the process 1600 may further include determining a region in the workspace where a future mobile drive unit density value will exceed a density threshold within a time period. The future mobile drive unit density value may represent the number of mobile drive units with respect to an area of the workspace. In this example, causing the on-demand sensor to collect the second sensor information may include causing the on-demand sensor to collect the second sensor information within the region.

In some examples, the on-demand sensor may be connected to an unmanned aerial vehicle configured for three-dimensional flight, a mobile drive unit configured for two-dimensional movement, or material handling equipment configured to manipulate items within the workspace.

In some examples, the process 1600 may further include receiving a request from the mobile drive unit for additional information about a region within the workspace. In this example, causing the on-demand sensor to collect the second sensor information may include instructing an automated device including the on-demand sensor to move to the region and collect the second sensor information. In this example, causing the on-demand sensor to collect the second sensor information may also or alternatively include providing information about the request to a plurality automated devices including a plurality of on-demand sensors and allowing the plurality of automated devices to select which of the plurality of automated devices will navigate to the region and collect the second sensor information.

In some examples, the on-demand sensor is one a plurality of on-demand sensors that periodically collect the second sensor information within the workspace. In this manner, the on-demand sensors may collect the second sensor information in a manner that maintains currentness of a current global view map of the workspace.

In some examples, monitoring movement of the mobile drive unit within the workspace may include monitoring movement of the mobile drive unit along a planned path for the mobile drive unit. In this example, causing the on-demand sensor to collect the second sensor information may include causing the on-demand sensor to collect the second sensor information at a region along the planned path that the mobile drive until will enter at a future time. The second sensor information may be useable for detecting obstructions within the region.

In some examples, causing the on-demand sensor to collect the second sensor information may include causing the on-demand sensor to collect the second sensor information at a predefined region within the workspace. In this example, the process 1600 may further include generating a three-dimensional representation of the predefined region based at least in part on the first sensor information and the second sensor information.

Figure 17:
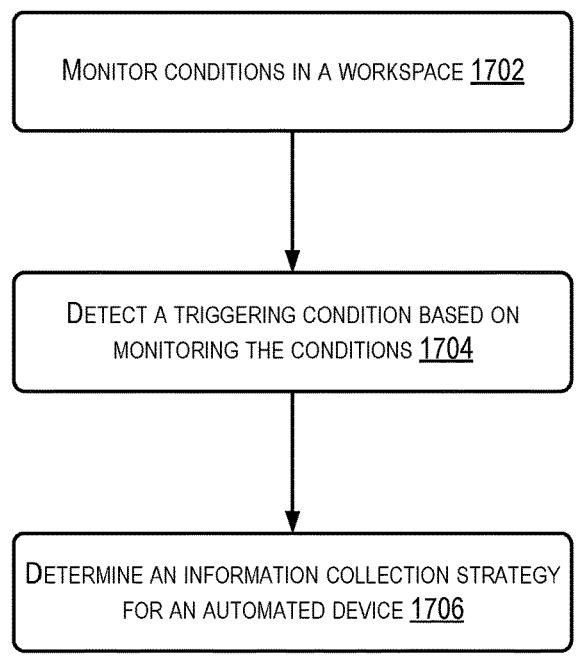
FIG. 17 illustrates an example flow diagram depicting example acts for implementing techniques relating to gathering visual information using combinations of fixed sensors and on-demand sensors, according to at least one example.

FIG. 17 illustrates a flow diagram depicting the process 1700 for implementing techniques relating to gathering visual information using combinations of fixed sensors and on-demand sensors, according to at least one example. The management module 15 (FIG. 3) may perform the process 1700 of FIG. 17.

The process 1700 may begin at 1702 by monitoring conditions in a workspace. In some examples, monitoring the conditions may be based at least in part on first visual information received from a fixed sensor that fixed at a position in the workspace.

At 1704, the process 1700 may include detecting a triggering condition based at least in part on monitoring the conditions.

At 1706, the process 1700 may include determining an information collection strategy for an automated device. The automated device may include a on-demand sensor. The information collection strategy may include information indicating a location within the workspace associated with the triggering condition and instructions for the automated device to orient the on-demand sensor for collecting second visual information at the location.

In some examples, the process 1700 may further include providing the information collection strategy to the automated device for execution by the automated device.

In some examples, the first visual information may include first image data. In this example, the second visual information may include second image data. In this example, the process 1700 may further include generating a three-dimensional representation of the location based at least in part on the first visual information and the second visual information.

In some examples, the instructions for the automated device to orient the on-demand sensor may include instructions for the automated device to orient a view angle of the on-demand sensor towards the location.

In some examples, the automated device is an unmanned aerial vehicle, a mobile drive unit, or a robotic manipulator.

Figure 18:
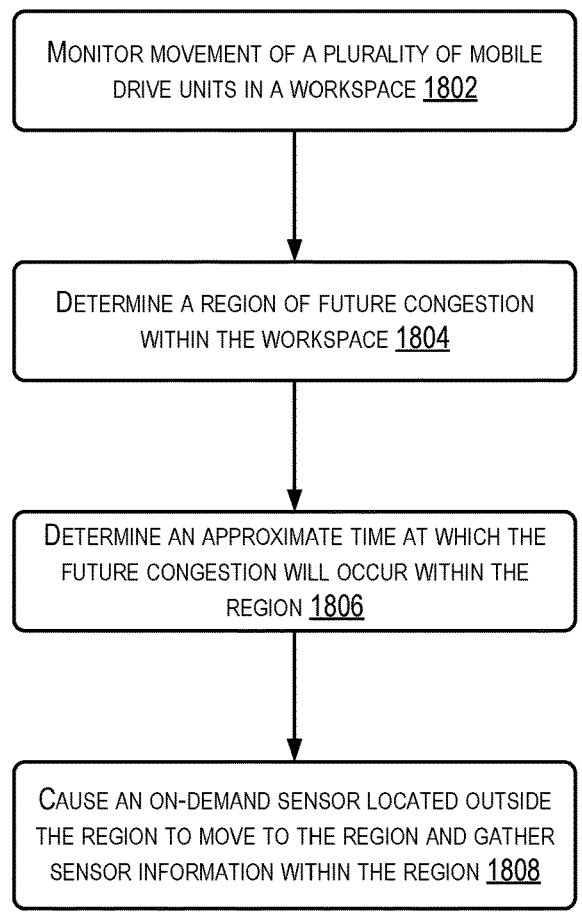
FIG. 18 illustrates an example flow diagram depicting example acts for implementing techniques relating to gathering visual information using combinations of fixed sensors and on-demand sensors, according to at least one example.

FIG. 18 illustrates a flow diagram depicting the process 1800 for implementing techniques relating to gathering visual information using combinations of fixed sensors and on-demand sensors, according to at least one example. The management module 15 (FIG. 3) may perform the process 1800 of FIG. 18.

The process 1800 may begin at 1802 by monitoring movement of a plurality of mobile drive units in a workspace. In some examples, the plurality of mobile drive units may be configured to transport a plurality of inventory holders in the workspace.

At 1804, the process 1800 may include determining a region of future congestion within the workspace. In some examples, determining the region of future congestion may be based at least in part monitoring movement of the plurality of mobile drive units.

At 1806, the process 1800 may include determining an approximate time when the future congestion will occur within the region. The approximate time may be a clock time. In some examples, the region of future congestion may include an intersection in the workspace at which a portion of the plurality of mobile drive units will arrive within a time window including the approximate time.

At 1808, the process 1800 may include causing an on-demand sensor located outside the region to move to the region and gather sensor information within the region. In some examples, causing the on-demand sensor to move to the region may occur prior to the approximate time determined at 1806. The sensor information may be representative of physical conditions present within the region.

In some examples, the sensor information is first sensor information. In this example, monitoring movement of the plurality of mobile drive units may be based at least in part on second sensor information received from a plurality of fixed sensors disposed within the workspace.

In some examples, the first sensor information may include first image data. In this example, the second sensor information may include second image data. In this example, the process 1800 may further include generating a three-dimensional representation of a portion of the region based at least in part on the first sensor information and the second sensor information.

In some examples, causing the on-demand sensor to gather the sensor information within the region may include instructing an automated device including the on-demand sensor to navigate to the region and collect the sensor information. In this example, the automated device may include a mobile drive unit or an unmanned aerial vehicle.

In some examples, causing the on-demand sensor to gather the sensor information within the region may include providing information about the region to a plurality automated devices including a plurality of on-demand sensors and allowing the plurality of automated devices to select which of the plurality of automated devices will navigate to the region and collect the sensor information.

Figure 19:
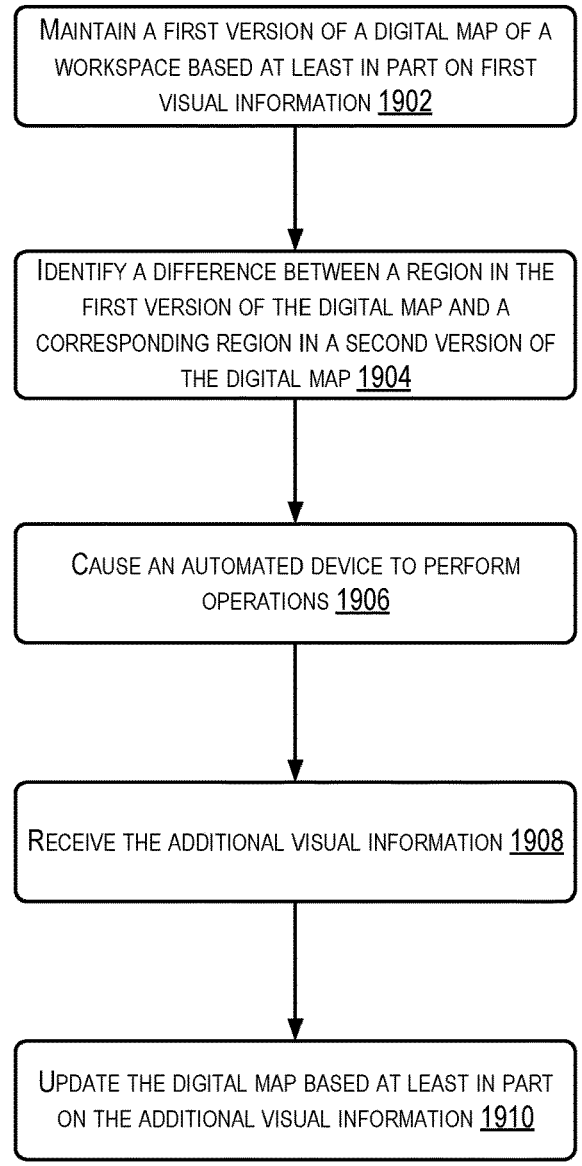
FIG. 19 illustrates an example flow diagram depicting example acts for implementing techniques relating to gathering visual information using combinations of fixed sensors and on-demand sensors, according to at least one example.

FIG. 19 illustrates a flow diagram depicting the process 1900 for implementing techniques relating to gathering visual information using combinations of fixed sensors and on-demand sensors, according to at least one example. The management module 15 (FIG. 3) may perform the process 1900 of FIG. 19.

The process 1900 may begin at 1902 by maintaining a first version of a digital map of a workspace based at least in part on first visual information. In some examples, the first visual information may be received from a portion of a plurality of fixed sensors. The digital map may include a plurality of regions corresponding to a plurality of areas within the workspace. In some examples, a plurality of mobile drive units may move about the workspace transporting a plurality of inventory holders that are configured to carry inventory items. The workspace may correspond to one or more floors in a warehouse. The first visual information may be received from one or more fixed sensors disposed at fixed locations within the workspace.

At 1904, the process 1900 may include identifying a difference between a region in the first version of the digital map and a corresponding region in a second version of the digital map. The difference may be representative of a change in a workspace condition in an area of the workspace corresponding to the region and the corresponding region. In some examples, a first portion of the plurality of regions is updated at a first update frequency and a second portion of the plurality of regions is updated at a second update frequency that is different from the first update frequency.

At 1906, the process 1900 may include causing an automated device to perform operations. In some examples, the operations may include navigating to the area in the workspace, orienting a mobile sensor of the plurality of mobile sensors, and using the mobile sensor to collect additional visual information at the area. In some examples, the automated device may be one of a plurality of automated devices disposed within the workspace. In some examples, the automated device may be an unmanned aerial vehicle, a mobile drive unit, or a robotic manipulator.

At 1908, the process 1900 may include receiving the additional visual information from the mobile sensor. In some examples, the additional visual information has a first resolution value that is greater than resolution values of the region and the corresponding region.

At 1910, the process 1900 may include updating the digital map based at least in part on the additional visual information. In some examples, updating the digital map may include combining a portion of the first visual information representing the region with the particular second visual information. This combination may result in an enhanced representation of the region. In some examples, updating the digital map may include generating a third version of the digital map.

In some examples, the digital map may include a three-dimensional representation of the workspace.

In some examples, identifying the region of the workspace for collection of the additional visual information may include identifying the region where a corresponding resolution value from the digital map falls below a resolution threshold. In this example, updating the digital map may include updating a digital representation of the region within the digital map such that the corresponding resolution value from the digital map at least meets the resolution threshold.

Figure 20:
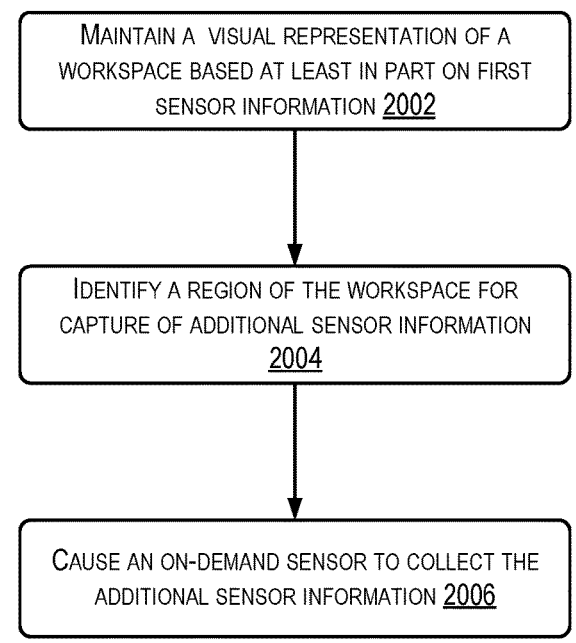
FIG. 20 illustrates an example flow diagram depicting example acts for implementing techniques relating to gathering visual information using combinations of fixed sensors and on-demand sensors, according to at least one example.

FIG. 20 illustrates a flow diagram depicting the process 2000 for implementing techniques relating to gathering visual information using combinations of fixed sensors and on-demand sensors, according to at least one example. The management module 15 (FIG. 3) may perform the process 2000 of FIG. 20.

The process 2000 may begin at 2002 by maintaining a global visual representation of a workspace based at least in part on first sensor information. In some examples, a set of fixed sensors may be positioned in the workspace. The first sensor information may be received from at least one fixed sensor of the set of fixed sensors.

At 2004, the process 2000 may include identifying a region of the workspace for collection of additional sensor information. In some examples, identifying the region of the workspace may be based at least in part on the global visual representation.

At 2006, the process 2000 may include causing the on-demand sensor to collect the additional sensor information within the region. In some examples, causing the on-demand sensor to collect the additional sensor information may be in response to identifying the region.

In some examples, causing the on-demand sensor to collect the additional sensor information may include causing an automated device to which the on-demand sensor is connected to present the on-demand sensor within the region such that the on-demand sensor can collect the additional sensor information. The automated device may be an unmanned aerial vehicle, a mobile drive unit, or a robotic manipulator.

In some examples, the process 2000 may further include updating, based at least in part on the additional sensor information, a portion of the global visual representation corresponding to the region to create an updated portion of the global visual representation corresponding to the region. In this example, the process 2000 may further include identifying one or more objects present in workspace and represented in the updated portion of the global visual representation, and monitoring movement of the one or more objects within the workspace. Monitoring the movement of the objects may include updating a record for the object in a location database. In some examples, monitoring movement of the objects may include projecting future paths for the objects. For example, speeds and directions of the objects may be accounted for to determine the projected future paths.

In some examples, the process 2000 may further include providing at least the updated portion of the global visual representation to a mobile drive unit of the plurality of mobile drive units. In this example, the updated portion of the global visual representation may be useable by the mobile drive unit for navigating within the workspace.

In some examples, the updated portion of the global visual representation may include a three-dimensional rendering of the region of the workspace.

In some examples, the process 2000 may further include detecting an inventory event occurring within the workspace. In this example, causing the on-demand sensor to collect the additional sensor information may further be based at least in part on the inventory event.

In some examples, identifying the region of the workspace for collection of the additional sensor information may include identifying the region where a corresponding resolution value from the global visual representation falls below a resolution threshold. In this example, the process 2000 may further include updating the global visual representation such that the corresponding resolution value from global visual representation at least meets the resolution threshold.

Figure 21:
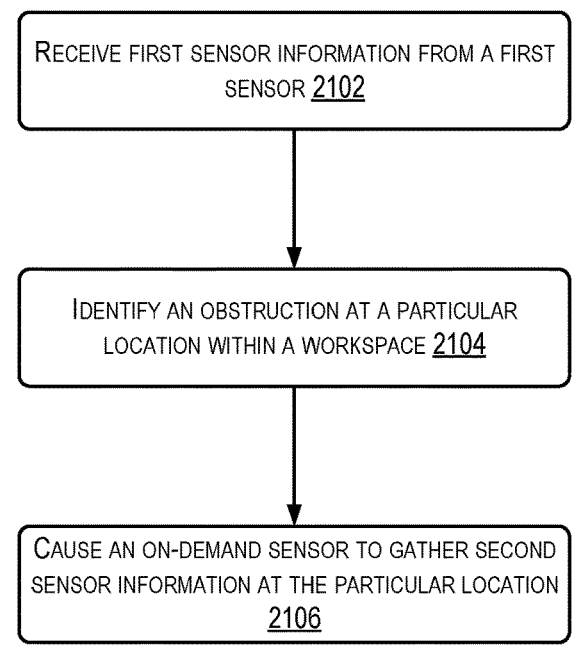
FIG. 21 illustrates an example flow diagram depicting example acts for implementing techniques relating to gathering visual information using combinations of fixed sensors and on-demand sensors, according to at least one example.

FIG. 21 illustrates a flow diagram depicting the process 2100 for implementing techniques relating to gathering visual information using combinations of fixed sensors and on-demand sensors, according to at least one example. The management module 15 (FIG. 3) may perform the process 2100 of FIG. 21.

The process 2100 may begin at 2102 by receiving first sensor information from a first sensor. In some examples, the first sensor information may include a representation of workspace conditions present at a particular location within a workspace in which a plurality of mobile drive units transport a plurality of inventory holders.

At 2104, the process 2100 may include identifying an obstruction at a particular location within the workspace. In some examples, identifying the obstruction may be based at least in part on the first sensor information.

At 2106, the process 2100 may include causing an on-demand sensor to gather second sensor information at the particular location. In some examples, causing the on-demand sensor to gather the second sensor information may be in response to identifying the obstruction. The second sensor information may include an enhanced representation of the workspace conditions present at the particular location.

In some examples, causing the on-demand sensor to gather the second sensor information at the particular location may include instructing an automated device including the on-demand sensor to navigate to the particular location and collect the second sensor information. In this example, the automated device may be a mobile drive unit or an unmanned aerial vehicle.

In some examples, causing the on-demand sensor to gather the second sensor information at the particular location may include providing information about the particular location to a plurality automated devices including a plurality of on-demand sensors and allowing the plurality of automated devices to select which of the plurality of automated devices will navigate to the particular location and collect the second sensor information.

In some examples, the first sensor may be an first onboard sensor of a first mobile drive unit. In some examples, the on-board sensor may be a second onboard sensor of a second mobile drive unit or a third onboard sensor of an unmanned aerial vehicle.

In some examples, the particular location may be located adjacent to a planned route of a mobile drive unit of the plurality of mobile drive units. In this example, the process 2100 may further include adjusting the planned route based at least in part on the second sensor information.

Figure 22:
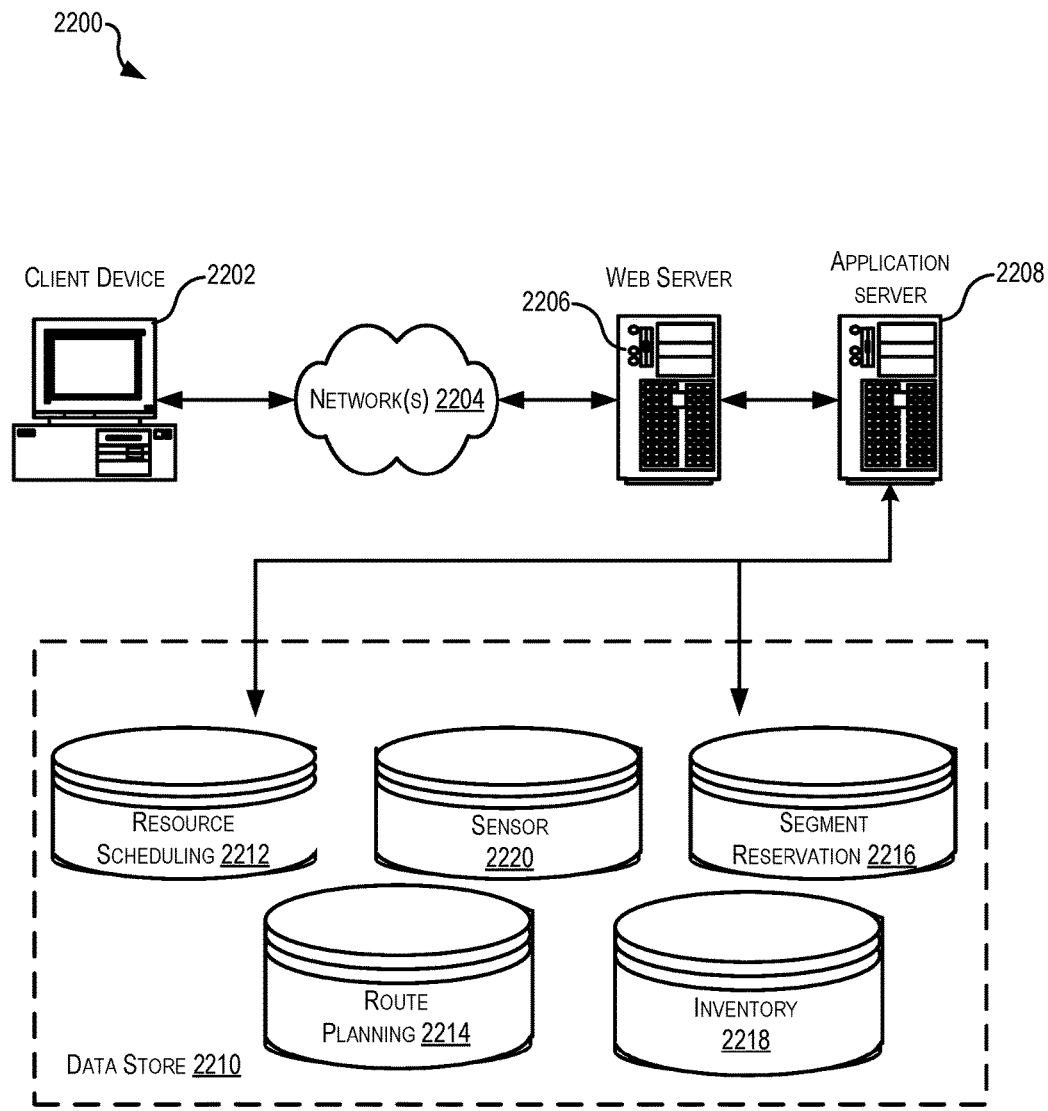
FIG. 22 illustrates an example environment in which various examples can be implemented.

FIG. 22 illustrates aspects of an example environment 2200 for implementing aspects in accordance with various examples. As will be appreciated, although a Web-based environment is used for purposes of explanation, different environments may be used, as appropriate, to implement various examples. The environment includes an electronic client device 2202, which can include any appropriate device operable to send and receive requests, messages, or information over an appropriate network 2204 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 2206 for receiving requests and serving content in response thereto, although for other networks an alternative device serving a similar purpose could be used as would be apparent to one of ordinary skill in the art.

The illustrative environment includes at least one application server 2208 and a data store 2210. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1502 and the application server 1508, can be handled by the Web server. It should be understood that the Web and application servers are not required and are merely example components, as structured code discussed herein can be executed on any appropriate device or host machine as discussed elsewhere herein.

The data store 2210 can include several separate data tables, databases or other data storage mechanisms and media for storing data relating to a particular aspect. For example, the data store illustrated includes mechanisms for storing information which can be used by modules described herein, such as resource scheduling information 2212, route planning information 2214, segment reservation information 2216, inventory information 2218, and/or sensor information 2220. It should be understood that there can be many other aspects that may need to be stored in the data store, such as for page image information and to access right information, which can be stored in any of the above listed mechanisms as appropriate or in additional mechanisms in the data store 2210. The data store 2210 is operable, through logic associated therewith, to receive instructions from the application server 2208 and obtain, update or otherwise process data in response thereto.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one example is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 22. Thus, the depiction of the system 2200 in FIG. 22 should be taken as being illustrative in nature and not limiting to the scope of the disclosure.

The various examples further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most examples utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk®. The network can be, for example, a local area network, a wide-area network, a virtual private network, the Internet, an intranet, an extranet, a public switched telephone network, an infrared network, a wireless network, and/or any combination thereof.

In examples utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of examples, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate examples may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk ("DVD") or other optical storage, magnetic cassettes, magnetic tape, magnetic disk storage or other magnetic storage devices or any other medium which can be used to store the desired information and which can be accessed by the a system device. Based at least in part on the disclosure and teachings provided herein, a person of ordinary skill in the art will appreciate other ways and/or methods to implement the various examples.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Preferred examples of this disclosure are described herein, including the best mode known to the inventors for carrying out the disclosure. Variations of those preferred examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A system, comprising:
    a plurality of mobile drive units configured for material transportation within a workspace;
    a plurality of fixed sensors disposed at a plurality of fixed locations within the workspace, the plurality of fixed sensors configured to collect first sensor information regarding movement of the plurality of mobile drive units relative to the plurality of fixed locations;
    a plurality of unmanned aerial vehicles moveable within the workspace and comprising sensors configured to collect second sensor information regarding movement of the plurality of mobile drive units; and
    a management module in communication with the plurality of mobile drive units, the plurality of fixed sensors, and the plurality of unmanned aerial vehicles, the management module configured to:
        monitor movement of the plurality of mobile drive units within the workspace based at least in part on the first sensor information;
        receive a request for information about a condition at a location in the workspace, the location comprising a path intersection of a planned path of a mobile drive unit, and the condition comprises an obstruction condition present at the path intersection;
        request, based at least in part on receiving the request, an unmanned aerial vehicle of the plurality of unmanned aerial vehicles to navigate to the location and use a sensor connected to the unmanned aerial vehicle to collect second sensor information at the location, the request identifying the location and comprising instructions for orienting a view angle of the sensor to collect the second sensor information; and
        enable the unmanned aerial vehicle navigate to the location and execute the instructions.

2. The system of claim 1, wherein receiving the request for information about the condition comprises receiving the request from the mobile drive unit of the plurality of mobile drive units or from a different mobile drive unit of the plurality of mobile drive units.

3. The system of claim 1, wherein the management module is further configured to:
    receive the second sensor information from the sensor of the unmanned aerial vehicle, the second sensor information providing a representation of the obstruction condition at the location in the workspace; and
    determine an adjustment to the planned path of the mobile drive unit based at least in part on the obstruction condition.

4. A system, comprising:
    an on-demand sensor available for selective deployment within a workspace in which a plurality of mobile drive units operate; and
    a management module in communication with the on-demand sensor, the management module configured to:
        monitor movement of a mobile drive unit within the workspace based at least in part on first sensor information received from a fixed sensor within the workspace, the first sensor information comprising a first representation of a fixed location where the fixed sensor is located;
        detect a triggering condition relating to movement of the mobile drive unit within the workspace; and
        in response to detecting the triggering condition, cause the on-demand sensor to collect second sensor information at a particular location within the workspace, the particular location being associated with the triggering condition, the second sensor information comprising a second representation of the particular location.

5. The system of claim 4, wherein:
    the fixed sensor is positioned at the particular location within the workspace; and
    the second representation comprises an enhanced representation of the particular location.

6. The system of claim 4, wherein:
the management module is further configured to:
monitor movement of a plurality of other mobile drive units within the workspace; and
determine a region in the workspace adjacent to the particular location where a future mobile drive unit density value will exceed a density threshold within a time period, the future mobile drive unit density value representing the number of mobile drive units with respect to an area of the workspace; and
the management module is further configured such that causing the on-demand sensor to collect the second sensor information comprises causing the on-demand sensor to collect the second sensor information within the region.

7. The system of claim 4, wherein the on-demand sensor is connected to an unmanned aerial vehicle configured for three-dimensional flight, a mobile drive unit configured for two-dimensional movement, or material handling equipment configured to manipulate items within the workspace.

8. The system of claim 4, wherein
the management module is further configured to receive a request from the mobile drive unit for additional information about the particular location; and
the management module is further configured such that causing the on-demand sensor to collect the second sensor information comprises:
instructing an automated device including the on-demand sensor to navigate to the particular location and collect the second sensor information; or
providing information about the request to a plurality automated devices including a plurality of on-demand sensors and allowing the plurality of automated devices to select which of the plurality of automated devices will navigate to the particular location and collect the second sensor information.

9. The system of claim 4, wherein the on-demand sensor is a mobile on-demand sensor connected to a different mobile drive unit or an unmanned aerial vehicle, or a fixed on-demand sensor connected to a robotic manipulator.

10. The system of claim 4, wherein:
the management module is further configured such that monitoring movement of the mobile drive unit within the workspace comprises monitoring movement of the mobile drive unit along a planned path for the mobile drive unit; and
the management module is further configured such that causing the on-demand sensor to collect the second sensor information comprises causing the on-demand sensor to collect the second sensor information at a region along the planned path that the mobile drive unit will enter at a future time, the second sensor information useable for detecting obstructions within the region.

11. The system of claim 4, wherein the management module is further configured such that causing the on-demand sensor to collect the second sensor information comprises sending an automated device to which the on-demand sensor is connected information identifying the particular location and instructions for orienting a view angle of the on-demand sensor to collect the second sensor information.

12. The system of claim 4, wherein the triggering condition comprises at least one of a detected obstruction, a change in conditions at the particular location, or a request from the mobile drive unit for additional route information.

13. A system, comprising:
a fixed sensor positioned at a fixed location in a workspace;
an on-demand sensor connected to an automated device, the on-demand sensor being available for selective deployment within the workspace; and
a management module in communication with the fixed sensor and the automated device, the management module configured to:
monitor conditions in the workspace based at least in part on first visual information received from the fixed sensor;
detect a triggering condition based at least in part on monitoring the conditions;
determine an information collection strategy for the automated device, the information collection strategy comprising information indicating a location within the workspace associated with the triggering condition and instructions for the automated device to orient the on-demand sensor for collecting second visual information at the location; and
provide the information collection strategy to the automated device for execution by the automated device.

14. The system of claim 13, wherein:
the first visual information comprises first image data;
the second visual information comprises second image data; and
the management module is further configured to generate a three-dimensional representation of the location based at least in part on the first visual information and the second visual information.

15. The system of claim 13, wherein the instructions for the automated device to orient the on-demand sensor comprises instructions for the automated device to orient a view angle of the on-demand sensor towards the location.

16. The system of claim 13, wherein automated device is an unmanned aerial vehicle, a mobile drive unit, or a robotic manipulator.

* * * * *